Figure 1:
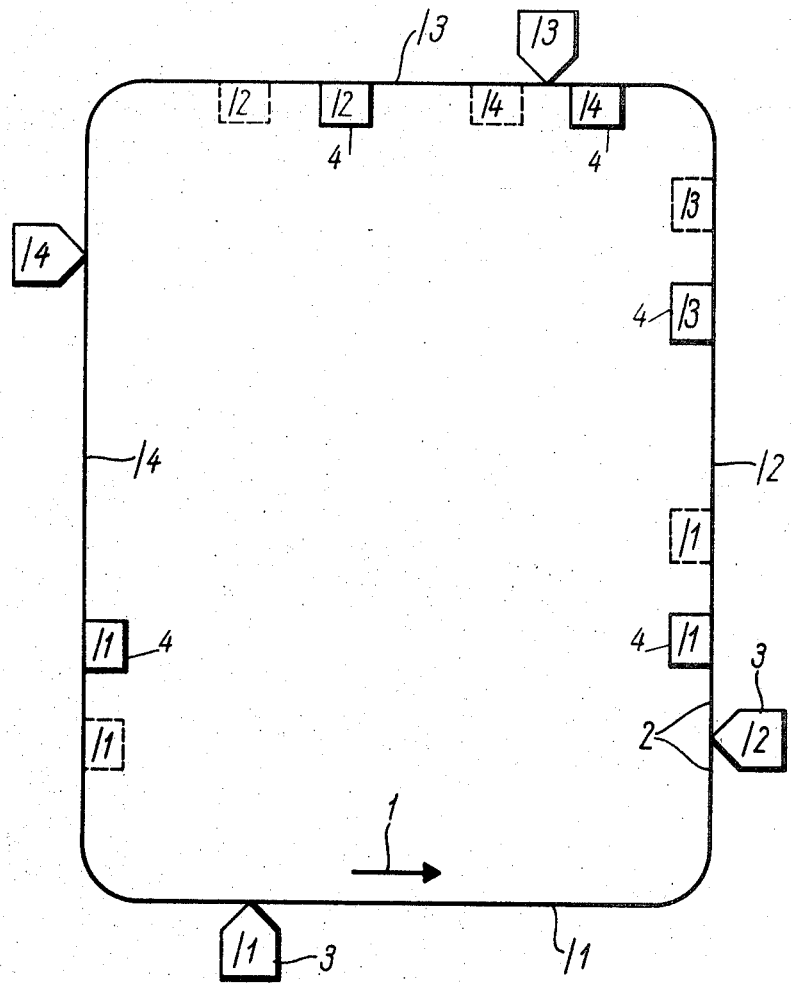

United States Patent [19]
Grooteboer

[11] 3,785,510
[45] Jan. 15, 1974

[54] METHOD FOR THE DESTINATION CONTROL OF OBJECTS FED INTO A DISTRIBUTING CONVEYING SYSTEM AND DISTRIBUTING CONVEYING SYSTEM FOR PERFORMING SUCH METHOD

[75] Inventor: Wilhelm Grooteboer, Sinzig, Germany

[73] Assignee: Alex Linder GmbH, Nuertingen, Germany

[22] Filed: Mar. 13, 1972

[21] Appl. No.: 234,005

[30] Foreign Application Priority Data
March 12, 1971 Germany............. P 21 11 934.6
Jan. 28, 1972 Switzerland.................. 1247/72

[52] U.S. Cl. ............................. 214/11 C, 214/152
[51] Int. Cl. .......................................... B65g 43/00
[58] Field of Search ................. 214/11 R, 11 C, 152

[56] References Cited
UNITED STATES PATENTS
3,573,748  4/1971  Holme.............................. 214/11 R
3,576,559  4/1971  Gerstenberger.................. 214/11 C Primary Examiner—Gerald M. Forlenza
Assistant Examiner—R. B. Johnson
Attorney—Arthur Schwartz et al.

[57] ABSTRACT

A method and apparatus for transporting items along conveyor sections to desired destination stations positioned along the conveyor sections. The system utilizes stored data for each item representing the item track section, item destination and item track section ranking.

30 Claims, 11 Drawing Figures

METHOD FOR THE DESTINATION CONTROL OF OBJECTS FED INTO A DISTRIBUTING CONVEYING SYSTEM AND DISTRIBUTING CONVEYING SYSTEM FOR PERFORMING SUCH METHOD

The present invention relates to a method for the destination control of objects which are fed into any desired station of a distributing conveying system with a recirculating conveyor and automatically discharged at destination, which may be any desired discharge station, said conveying system being divided into track sections such that none of said track sections passes over a station provided with facilities for switching an object to be conveyed from one track to another, and including an electronic control system comprising a store which, when an object is fed into the conveying system, receives the identification of the desired discharge station, hereinafter called destination tag, as input and which causes the said object to be discharged upon reaching its station of destination.

In accordance with prior art methods for the destination control of objects, normally placed in containers, in a distributing conveying system, such containers carry no information which indicates their destination. The destination is input in a central store in the form of a destination tag when the container containing the object to be conveyed is fed in at the feed station. In the central store, this destination information moves through the store in accordance with an analog representation of the path to be travelled through the conveying system at a speed which corresponds to the speed of the conveyor. When the information reaches a fixed point in the store which carries the same information, the container with the said object has reached its destination, whereupon a discharge pulse is released which causes the container to be removed from the conveying system at that specific station. To function properly, this method calls for exact synchronization between the mechanical conveying system proper and the electrical representation of is occupancy. The need for synchronization is apt to create difficulties because the conveyor may run at different speeds, e.g., as a result of differences in the distribution of loads. In particular, difficulties are bound to arise at the points of transfer to other types of conveying systems, e.g., at the point of transfer from an approximately horizontal conveyor to a vertical tower-type winder. This method is difficult to perform if, additionally, the system includes branches and crossings and, moreover, is required to meet different operating conditions such as preferences for specific tracks and specific times.

Methods for the control of distributing conveying systems wherein the containers carry a specific information with respect to their destination are also known in the art. The destination tag of the desired destination is applied to the container before the latter is fed into the system. At each discharge station which the container passes on its way through the system, the destination tag on the container is compared with a destination tag corresponding to that station. If the tags coincide, the container is ejected. If they do not coincide, the container moves on. Admittedly, such systems are of comparatively simple design. However, they have a drawback in that a complete scanning and comparing system must be provided at each station. Centralized control is impossible. This is a major disadvantage, especially in large installations. Another disadvantage is that such systems have no provision for specific preferences. At branches or junctions it is impossible to give preference to individual containers. The only preference which such systems permit is that for a specific track. A particular drawback of systems operating in accordance with such prior art methods consists in that the procedure for setting the coding on the containers is comparatively time-consuming and that the resulting difficulties tend to multiply as the number of stations increases.

It is the object of the present invention to provide a method for destination control in a distributing conveying system which obviates the need for reading devices at the stations, the need for marked containers and the need for synchronization between the mechanical conveying system and the electric store and yet warrants dependable operation.

In accordance with the present invention, this object is accomplished by storing, apart from the destination tag, two further items of information for each object, viz. the position tag which is defined as the identification of the following track section to which each object is transferred upon leaving a station, and a third item of information which indicates the position in which each object ranks in the order of all objects contained in a specific track section at any one time. The destination tag remains unchanged as long as the object is within the conveying system whereas its position tag is newly stored whenever the object enters a new track section, i.e., whenever it is shifted from one track section to another, in accordance with the identification of the newly entered track section and the third item of information related to the said object is given in accordance with the position in which the said object ranks in the order of all objects contained in the said specific track section and changed whenever one of the other objects contained in the same track section leaves that track section so as to reflect the new position in which the said object then ranks in the order of all objects contained in that track section.

A special advantage of the method in accordance with the present invention consists in that no synchronization is required between the speed of the recirculating conveyor and the processing of information. An item of information related to the container or object will be processed only when the container or object passes a "juncture," i.e., either when it is fed into the conveying system or when it reaches a station. In this context, the term station shall be interpreted to include switches, crossings and points of transfer to another conveying system. Generally, a station shall be defined as any facility for shifting the object from one track to another, the object being either fed into, or removed from, the track or transferred from one conveying system to another. Particularly advantageous is the fact that it is not necessary to provide each station with a reading device which reads out the information applied to the object. Compared with simulating systems, the present invention affords the advantage of requiring substantially less storage capacity since the storage capacity may be kept substantially below that required to provide for the maximum nugber of objects that can be physically accommodated in the conveying system. According to the present invention, the storage capacity may be adapted to suit the maximum number of objects that will actually be contained within the conveying system simultaneously at any one time and this number is always substantially below the physical capacity of the system. Another advantage of the method in accordance with this invention consists in that it permits of great flexibility in the design of conveying systems operated in accordance with the invention because the store, by suitable selection, may be employed for the most varied special applications such as preferential control actions whereby preferential treatment is given to objects fed in at, or addressed to, specific stations. Still another advantage of the method in accordance with this invention consists in that it may be performed with different types of stores, such as stores with direct access to each location (content addressable memories) or shift registers in which the items of information are advanced at timed intervals. Where such shift registers are employed, the third item of information may be stored in such a manner that it will not require any additional storage capacity, as will be described in detail hereinafter.

However, the present invention not only relates to a method of controlling a distributing conveying system, but also to a distributing conveying system with a recirculating conveyor comprising a plurality of feed and discharge stations for objects which are fed into the system at any desired station together with an indication of the destination in the form of a destination input and discharged automatically upon reaching such destination, the conveying system being divided into successive track sections and one station being interposed between every two track sections, with an electronic control system, electrically connected with each station, comprising a store which receives the identification tag of the desired discharge station as destination tag when an object is fed into the system and which causes the object to be discharged at the time it reaches its destination. It is another object of the present invention to simplify and improve such a distributing conveying system so as to provide a dependable distributing conveying system with a less elaborate and, consequently, less expensive control system. In accordance with the present invention, this object is accomplished by using a store which is capable of storing at least three items of information for each object to be conveyed, said items of information indicating the destination of the object, the track section in which it is contained and the position in which the object ranks in relation to the other objects contained in the same track section, by connecting a comparator which upon arrival of an object at a station compares the destination tag of that object with the station tag and, in case of coincidence, triggers the discharge mechanism of that station and by connecting to the said comparator a control logic which in case of non-coincidence allocates to the object a new item of information which contains the identifying tag of the next track section as new position tag and which also indicates that the said object is the last object in the following track section, while the destination tag remains unchanged.

For position identification, the system uses the identifying tag of the feed station or of the station which the object has just passed or else the identifying tag of the adjoining track section. Preferably, the identifying tag of a station and the identifying tag or designation of the track section adjacent to that station in the direction of conveyance are identical. Throughout the present specification, it will be assumed that the identifying tags of a station and the following track section are identical as this permits the facts involved to be represented in a simplified form. Where the identifying tags of a station and the following track section differ, the tag of that track section rather than the tag of the preceding station will have to be used for position identification. In turn, the identifying tag of the preceding track section is always identical with the tag identifying the station preceding that track section.

A special advantage of the present invention consists in that it does not require comparing devices and reading devices at every station whereby the costs per station for an apparatus in accordance with this invention are considerably reduced. The elimination of separate reading devices for each station also eliminates a source of trouble known to give rise to frequent complaints in operation. Another special advantage of the system in accordance with this invention consists in that it is very flexible in use. It is possible to concede preference to specific tracks or specific objects, e.g., when the objects fed in at a specific station are to be handled with preference at times of particularly heavy demand. Another advantage of the system in accordance with this invention consists in that the number of occupied store locations may be readily determined and that this number reflects the momentary loading of the system. The number of blank lines, blank levels or blank locations indicates the number of objects or containers that may be additionally fed into the system without first discharging an object or container at any point in the system. The terms container and object shall be equivalent for the purposes of this specification. Another advantage is that when the store is occupied to full capacity, a further object may be fed into the system after another object has been discharged at the same or any other station. This is possible because storage locations need not be permanently allocated to a specific station or track section. Finally, the system in accordance with this invention also caters for the possibility of providing an adequate supply of empty containers at those stations which have a particularly heavy demand for such empty containers. Still another advantage consists in that the capacity of the store may be rated for the maximum number of objects that will have to be conveyed simultaneously at any one time, which means that with a system in accordance with this invention the storage capacity is not a function of the physical size of the system and that no allowance need be made for the contingency of a "jam" at one point of the system. The apparatus in accordance with the present invention may, therefore, be used to advantage for both large and small installations.

The stores or memories employed may be of different types which are known per se. For example, the store may be a shift register in which the stored information is advanced at timed intervals. Another embodiment of the present invention includes a store whose locations are directly accessible. In the English-language literature, such stores are described as "content addressable memories or direct access memories." In both types of store, the storage capacity per location or address is usually sufficient to accommodate three items of information. However, according to a particularly preferred embodiment of this invention, which includes a shift register, the third item of information is expressed by the sequence of information contained in the shift register. This is accomplished by an arrangement whereby the destination and position tags are entered into a free line of the shift register whenever an object enters a track section and whereby the free line is selected so that in the store these two tags are located after all other items of information with the same position tag in the direction of information flow, the information located in the last line of the store being reentered into a free line of the store which, in the direction of information flow, is located after all items of information with the same position tag as long as the corresponding object is contained in a track section of the conveying system. Thus, the sequence of information in the shift register need not correspond to the sequence of objects or containers in the conveying system. The only condition which must be fulfilled is that the sequence of information must agree with the sequence of the containers within a track section. However, between these items of information the store may contain any other desired information. The special advantage of this embodiment consists in that it permits the space for the third item of information to be saved so that the store may be smaller and less expensive. Although the information in the store bears no fixed relation to a specific container while that container travels through the system, it is, surprisingly, possible to determine the destination and position tags corresponding to a specific container when it enters a station. To achieve this, all that is required is picking out that item of information which, in the direction of information flow in the store, is the first among all items of information carrying the position tag of the preceding station. As the information in the store is ordered in the sequence of the containers in the track section, the first item of information must necessarily correspond to the first container. The first container must necessarily also be the first to enter the next station so that correspondence between containers and information is always assured at the only point in time where such correspondence is required, viz. upon arrival at a station.

According to preferred embodiments of this invention, an object entering a station is detected by means of a sensor and an item of information is formed which is composed of the tag identifying the preceding station as position tag and the tag identifying the station which the object is entering as destination tag. The information so formed is compared with the first item of information in the shift register which, in the direction of information flow, has the same position tag. If the two destination tags coincide, a discharge pulse is released for the station concerned, whereas if the two destination tags do not coincide, the information is withdrawn from the shift register, the position tag of this information replaced by the position tag of the station which the object is entering and this new information containing the original destination tag reentered into a free line of the shift register after all items of information having the same position tag. Thus, when a container passes a station, the information is adapted to the new position of the object which enters the following track section as the last of all objects contained in that track section unless it is discharged at that station.

The various stations may be permanently connected to the electronic control system which performs the functions described above whenever an object is fed into the conveying system or enters a station. For proper functioning, it is only necessary to ensure that such an event does not occur simultaneously at two stations, e.g., by causing a delay at one station. However, according to preferred embodiments of this invention, the various stations are successively connected to the electronic control system during a station scanning interval and the information contained in the store completes at least one full cycle during each station scanning interval. The operating speed of contemporary electronic components is such that all stations can easily be scanned within a time which is so brief that even an object-feeding or entering operation commencing directly upon termination of the station scanning interval will not be completed before the next station scanning interval occurs at that station. To make sure that the full content of the store will be compared with the information formed upon entry of an object into a station, irrespective of the order in which the varies items of information are arranged, the information contained in the store is caused to complete at least one full cycle during the station scanning interval whereby all items of information in the store are compared with the information formed upon entry of the object into a station. This is accomplished, in a simple manner, by adapting the number of timing pulses or clock pulses applied to the shift register during one station scanning interval so as to be equal to the number of lines or levels of the shift register. It is, of course, also possible to apply an integral multiple of this number of timing pulses in which case the information content of the shift register is cycled several times. However, a more expedient arrangement is one in which the shift register completes only one cycle at a time whereupon the system is switched over to scanning the next station.

In a preferred embodiment of the invention, a single-line feedback store is interposed between the output and input of the shift register. If no information is contained in the last line of the shift register, the feedback store is disconnected from the shift register during the next timing pulse and reconnected at the beginning of the next station scanning interval. The special advantage of this embodiment consists in that it enables the information contained in the shift register to be "condensed." During each station scanning interval, a free line between the items of information is "erased," i.e., the items of information are pushed together so that the number of free lines between the individual items of information is reduced by one during each station scanning interval. At the beginning of the next station scanning interval, the feedback store is again integrated in the flow of information. This arrangement also ensures that the first line of the shift register will always be blank with the last timing pulse of the station scanning interval since connection of the then blank feedback store results in a blank first line with the next timing pulse. As long as the store is not fully occupied, it is thus possible to again enter an item of information, related to an object which has been newly fed into the system or else an object which is passing the station and just entering into the next track section, with the last timing pulse of each station scanning interval.

When an object is fed into a station, its destination tag is selected by means of dials, for example. From these dials, the information indicating the destination of the object could be fed directly to the shift register. However, according to a preferred embodiment of this invention the destination tag selected when an object is fed into a station is temporarily stored or "buffered" in a destination store and, together with the position tag, entered into the shift register with the last timing pulse of the station scanning interval when the object enters into the next track section. According to a further development of the present invention, a check is made before an object is newly fed into the conveying system from a station in order to determine whether a free line which is suitable for receiving the information allocated to that object is available in the shift register. If no suitable free line is available, admittance of the object will be prevented by a lock. This lock will be effective only until another object is discharged at any point of the whole conveying system because in that instant, at the latest, a line will become free in the shift register. Without such a lock, the shift register would have to be dimensioned for the maximum number of objects that may be simultaneously contained in the conveying system at any one time. In other words, the shift register would have to be dimensioned for peak loading. The said lock enables the shift register to be designed for a smaller than the maximum possible peak load without appreciably affecting the operating characteristics of the system. Normally, the fact that a station has been locked will not even be noticed by the operator because the locked condition is usually limited to fractions of a second car, at the most, a few seconds.

For normal operation of a simple system, a shift register is sufficient which can accommodate the position and destination tags in each line. However, according to a preferred embodiment of this invention each line or level of the shift register has additional storage capacity for further items of information which are moved by the timed shifting operations together with the position and destination tags. These additional locations may be used to store additional information or instructions for additional control functions, such as unlocking signals, switch operating signals or the like. Mutatis mutandis, the same also applies to other types of stores. The shift register may have a plurality of inputs. For instance, each line may be provided with a connection. Preferably, however, the shift register has one input, as known per se, which is connected to the first line in the direction of information flow. Commercially available shift registers with only one input and one or two output connections are substantially less expensive than shift registers with more connections.

The preferred embodiment includes an "occupied" lock for the shift register which releases a locking function when there is no free line in the shift register. If the shift register has a connection for each line, all lines must be scanned by the "occupied" lock. If, on the other hand, the shift register is provided with a single input connection, it is sufficient to connect the "occupied" lock with the first line of the shift register. Feeding an object into the system is only possible when the "occupied" lock determines that the first line of the shift register is free, whereupon the information related to the object fed into the system is read into said first line. In the preferred embodiment, the "occupied" lock is connected with locking barriers at all feed stations.

As already mentioned, a store other than a shift register may be used alternatively, such as a store with immediate access to all locations. In that case, the third item of information is input as serial number. The serial numbers correspond to the order in which the objects being conveyed succeed each other within a track section. When this order changes, the serial numbers are changed accordingly. Thus, the arrangement of the various items of information in the store no longer serves as the code which indicates the sequence of objects and the information in the store may be arranged in any desired order. Whenever an object is transferred to a specific track section, the total number of objects contained in that track section is determined and the next serial number is allocated to the additional object transferred to that track section. Cyclical scanning of the various stations is also possible with these embodiments of the invention, the various stations being connected to the same wires of a common line. Alternatively, a separate cable may be run to the electronic control system from each station such that each station has its own wires.

Otherwise, the basic principle of operation of this arrangement is the same as that of the arrangement incorporating a shift register as previously described. Of course, the control details are selected to suit the characteristics of the different types of stores employed. The characteristics of the different stores and the various selection, processing and reading units are known per se. They are not, or only slightly, different from the known units customarily employed in connection with digital computer techniques.

To locate a specific item of information in the store, part of the stored information is used as seek address. If, for instance, the destination track is used as seek address, all items of information featuring this destination track will be read out together with their corresponding destination identifications and serial numbers. The information may be read in at any desired free location in the store. Furthermore, additional items of auxiliary information may be carried along in the store, such as information related to the container, its destination or the track.

In preferred embodiments of a distributing conveying system in accordance with the present invention comprising a shift register in which the information is advanced in response to pulses generated by a clock, an output of the shift register may be connected to an input of the shift register; the output of the shift register has connected to it a comparator and the comparator, in turn, has connected to it a search store connected to a search detector which upon entry of an object into a station furnishes the identifying tag of that station as destination tag and the identifying tag of the preceding station passed by that object as position tag, the "yes" output of the comparator is connected to a pulse emitter which sends an output signal to the station concerned and furnishes an erase signal for the corresponding information in the shift register and search store and the electronic control system is provided with a destination store which is connected with an input of the shift register and the destination tag of which, upon transfer of an object from a station into the adjoining track section, is entered as destination tag together with the identifying tag of that station, which tag is used as position tag. An embodiment of this type has the advantage of a particularly simple and inexpensive design. Stores which meet the specified requirements are commercially available.

Furthermore, according to preferred embodiments of this invention, the output of the shift register connected to the last line or level of the shift register in the direction of information flow has connected to it the input of a single-line feedback store whose output may be connected to the input of the shift register.

A special advantage of such a distributing conveying system consists in that the shift timing is not dependent on the speed of the conveying system. This means that one and the same system may include track sections running at different speeds without any adverse effect for the functioning of the control system. Thus, it is, for instance, possible to combine horizontal conveyors with tower-type winders.

An advantage of using a feedback store consists in that it enables the information contained in the shift register to be "condensed." During each station scanning interval, a free line between the various items of information as "erased." In other words, the various items of information are pushed together so that the number of free lines between the various items of information is reduced by one during each station scanning interval.

In principle, an item of information may be entered whenever a suitable blank line is available. According to preferred embodiments of this invention, a check is made before the last timing pulse during the station scanning interval to find out whether the last line of the shift register, which is reconnected to the input, or the feedback store is free. If the answer is yes, a new item of information is entered into the first line of the shift register with the last timing pulse. Provided that the feedback store is disconnected during each station scanning interval, a free line will always be available at the time of the last timing pulse since the feedback store is reconnected prior to the first timing pulse of the next station scanning interval and the blank line so produced is cycled through the store so that the first line will be blank at the time of the last timing pulse. Only when the store is filled to capacity may it happen that the first line is not blank at the time of the last timing pulse. To advance the connection from the electronic control system to the various stations, a separate clock or timing pulse generator may be provided which is synchronized with the timing pulse generator furnishing the shift timing pulses during the station scanning interval. According to a preferred embodiment of the present invention, the timing pulses of the timing pulse generator for the shift register are also used to advance the connection from the electronic control system to the various stations and the connection from the electronic control system to the scanned station is switched over to the next station to be scanned by the timing pulse following upon the last timing pulse of a station scanning interval. In this arrangement, all timing pulses may have the same amplitude and duration. Whether a specific pulse is a shift timing pulse or a switch-over pulse may, for instance, be decided by a following ring counter whose number of levels exceeds the number of levels of the shift register by one. Alternatively, every timing pulse effecting a switch-over may have a polarity, amplitude or duration differing from the shift timing pulses.

After an object has been discharged from the conveying system, the information corresponding to that object must be removd from the store. One possibility of achieving this is by preventing this item of information from returning to the input of the shift register, e.g., by interrupting the feed line to the input of the register. Alternatively, an erase signal emitter may be provided which may be connected to the output or the input of the shift register and which furnishes an erase signal which erases the information at the time the information to be erased appears at the output or input.

The stations of the system described may be of relatively simple design since they are not required to compare or read any addresses. It is sufficient to equip each station with one sensor for objects arriving from the preceding track section and one sensor for objects entering into the following track section, said sensors to be connectable to the electronic control system.

The one sensor sends a signal to the electronic control system which indicates the arrival of an object and the other sensor a signal which indicates the dispatch of an object. If the electronic control system is connected to all stations simultaneously, the sensors of all stations must additionally be provided with a special identifying tag permitting the electronic control system to recognize the station at which a specific event is occurring. However, if the electronic control system may be cyclically connected to all stations, as envisaged by preferred embodiments of the present invention, allocation of the sensors to their respective stations results automatically since the only signals that can arrive are those emitted by the sensors of the station selected at any one time. A certain minimum speed of the scanning cycles must, however, be maintained to ensure that the duration of the signals emitted by the sensors exceeds the time during which all stations of the entire conveying system are scanned.

Thus, according to one embodiment of this invention, the frequency or rate of a clock or timing pulse generator is set to $f_T = n(i+2)v/l$, where $n$ is the number of stations, $i$ the number of lines of the shift register, $v$ the speed of the object and $l$ the minimum distance between the end of one and the start of the next object on the conveyor. Furthermore, the switching frequency of the cyclic connection of all stations with the electronic control system is $f_s = f_T/n$. Since the operating and switching speeds of common electronic components are very high, even systems with conveying speeds in the order of m/sec can be operated without any difficulty with clearances of a few centimeters between successive objects, even with a large number of stations along the conveyor and with shift registers having a great number of lines.

The search detector, which supplies the search store with the information required from time to time, includes a ring counter which is advanced at the switching frequency $f_s$, whose number of levels is equal to the number n of stations in the system and whose switching position yields the identifying tag of the station connected to the electronic control system at that instant. This identifying tag is entered into the search store at the location corresponding to the location in the shift register which contains the destination tag. According to a further development of this invention, the search detector includes a further ring counter which is advanced at the switching frequency $f_s$, whose number of levels is equal to the number n of stations in the system, whose switching condition always lags one step behind the first ring counter of the search detector and whose switching position yields the identifying tag of the preceding station. In this connection, it should be noted that the identifying tag of the preceding station is identical with the identifying tag of the track section preceding the station which is just connected with the electronic control system as viewed in the direction of conveyance. This information of the second ring counter of the search detector is entered into the search store at the location corresponding to the location in the shift register which contains the position tag. Thus, the search detector affords the advantages of a very simple design and a very simple method of operation. Together with the search store and the comparator, the search detector enables the object arriving at the station to be identified.

To connect and disconnect the feedback store to and from the output of the shift register, preferred embodiments of this invention include a bistable logic element as level change-over switch whose setting input is so connected to the timing pulse generator that at the beginning of the station scanning interval it is flipped into the position in which the feedback store is connected and that its resetting input is so connected to the comparator that it flips back into its original position in which the feedback store is disconnected when the comparator responds to a coincidence of the position tags at the outputs of the shift register and the search store. This arrangement ensures that at the beginning of a station scanning interval the feedback store is always connected whereby the information contained in the last line of the shift register is transferred to the feedback store with the following timing pulse and returned from the feedback store to the input of the shift register with the timing pulse following immediately thereafter. If no signal is received by the search store because no object is entering the scanned station at that moment, the comparator responds as soon as no information appears in the last line of the shift register because in that case this position tag 0 is identical with the position tag 0 contained in the search store. As a result, the feedback store is disconnected and this blank line thus removed from the shift register after the next timing pulse at which this 0-information is transferred to the feed-back store. On the other hand, the fact that the feedback store is connected at the beginning of each station scanning interval ensures that the first line of the shift register is blank after the first shift timing pulse which, in turn, ensures that at the time of the last pulse this blank line is located in the first line of the shift register so that this line is always free to accommodate new information. Thus, all that is necessary is to make sure that such new information is always entered into the register with the last shift timing pulse. Such new information can always be accommodated until all lines of the register are occupied.

According to a further development of the invention, a bistable logic element, such as a flip-flop, is used as input switch for entering the station identifying tag of the simultaneously scanned station and the destination tag contained in the destination store into the shift register, the setting input of the said bistable logic element being connected with the arrival sensor of the station and a feed signal emitter and being settable by them, while the resetting input of the said logic element receives the last timing pulse of a station scanning interval as resetting signal. The logic operation of this bistable logic element with respect to the other circuit elements is such that it will not pass the destination and position tags to the input of the shift register until it is reset by the last timing pulse. What is achieved thereby is that the input of new information into the input of the shift register will invariably occur when the last timing pulse and only when the last timing pulse, when the first line of the shift register is free. An item of information can only be entered into the shift register when an object reaches the station which shall not be discharged, i.e., an object which continues on its way through the conveying system, or when an object is newly fed into the station.

According to preferred embodiments of this invention, the logic operation of the destination store with respect to the remainder of the circuitry is such that its input may be temporarily connected to the output of the shift register or to the destination input of the station connected to the electronic control system. In the first case, the destination store serves as temporary storage or "buffer" for the information indicating the destination of an object if such object merely passes the station without being discharged and its destination tag is, therefore, reentered into the shift register, together with the new position tag, when the said object is fed into the next track section. In the latter case, the destination store serves as "buffer" for the information related to an object which is newly fed into the conveying system and this information is retained until the last shift timing pulse of the corresponding station scanning interval is given. According to a preferred embodiment of the present invention, the destination store switch is a bistable logic element whose setting input may be connected to the arrival sensor of the station connected to the electronic control system and whose resetting input is connected to the "yes" output of the comparator which only checks the position tag. Consequently, the destination store switch permits the destination information of the last line of the shift register to pass into the destination store only if the position tags of the search store and the last line of the shift register coincide and if, at the same time, the corresponding destination tags do not coincide (because otherwise the object would have to be discharged) and if, additionally, an $a$-signal is being received from the arrival sensor. Furthermore, one of the timing signals must be available since the entire electronic control system is clock-actuated, i.e., operating in response to pulses generated by a timing pulse generator.

In accordance with a further development of this invention, a bistable logic element may be used as erasing switch for the information of the first line of the shift register, the setting input of this bistable logic element being connected to the arrival sensor of the station connected to the electronic control system and, in case of coincidence between the position and destination tags, to the "yes" output of the comparator, while its resetting output is so connected with the timing pulse generator that the last timing pulse of each station scanning interval may be used as erasing signal for the first line of the shift register and the trailing edge of the said timing pulse as resetting signal for the erasing switch. In other words, the erasing switch is set when the position and destination tags in the last line of the shift register and in the search store coincide and when, in addition, the arrival signal and one of the timing signals are being applied. Resetting of the erasing switch is effected by the last timing pulse of a station scanning interval.

To ensure that the information to be entered into the shift register with the last shift timing pulse is available in the proper timed sequence, one embodiment of the invention includes a circuit group with at least two bistable logic elements which are connected to a line with the station scanning timing pulses $m$ and with feed or arrival signals $e$ or $a$. The first bistable logic element must then meet the requirement $m (e + a)$ for setting and the requirement $m (e + a)$ for resetting; setting of the second bistable logic element, which coincides with the trailing edge of the station advancing pulse, requires that the first logic element be set, while resetting is only possible when the first logic element is in the reset position. In the output of the circuit group, there is provided a gate which is open when the first logic element is set and the second logic element is reset. This arrangement enables the feed and arrival signals to be processed in the manner desired.

A conveying system in accordance with this invention may be readily adapted to growing capacity requirements by subsequent extension. To this end, spare connections are provided for additional stations which, although initially not provided with stations, already bear an identifying tag and are treated like operative stations by the electronic control system. The advantage of this arrangement consists in that no major modification of the electronic control system will be necessary when the corresponding stations are installed at a later date. Input of the identifying tags into the search store is effected via an additional double gate to which the station identifying tags delivered by the two ring counters are applied.

During operation of a distributing conveying system it may happen that a wrong destination tag is selected by mistake. As long as this wrong destination tag relates to an existing station the only consequence is that the object is dispatched to the wrong station. However, if a destination is selected which is not related to any existing station, the object will be discharged nowhere and circulate through the system indefinitely. The result is that space is unnecessarily taken up in the system and that, in addition, the object concerned becomes undiscoverable because normally nobody will know that it is in the system since the operator selecting the non-existent destination normally will not notice that he has entered a wrong destination tag. To avoid disturbances resulting from such mistakes, a preferred embodiment of the invention includes an identifying tag emitter at the output of which all identifying tags existing in the system will appear on call. In addition, a further comparator is provided for comparing these tags with an entered destination tag. This comparator has an output which emits an error signal if the destination does not coincide with any of the tags emitted by the identifying tag emitter. According to further development of the invention, the error signal output may be connected to a destination generator which generates a collective destination tag. A wrong destination input, i.e., the input of a destination which does not exist in the system, will then merely cause the object concerned to be ejected at a collecting station corresponding to the collective destination tag. Thus, objects are prevented from "wandering around" through the system. According to another embodiment of this invention, this destination generator is replaced by a locking signal emitter which locks the corresponding feed station from which the wrong destination tag was entered in response to an error signal. This embodiment has the advantage that the operator entering the wrong destination tag notices that he has made a mistake. To unlock the feed station, he is then compelled to enter a destination tag which exists in the system, whereupon the object will be dispatched to the station corresponding to that destination tag.

According to preferred embodiments of this invention, each station is provided with a feed opening equipped with a locking arrangement and an operable route switch with a detecting element located downstream of that switch for the purpose of discharging arriving objects. The design of the locking arrangement may be such as to ensure that an object to be fed into the system will be fed in at the proper time i.e., when sufficient clearance is available between two successive objects travelling through the system. The operable switch is actuated via the comparator when the position and destination information in the last line of the shift register and in the search store coincides.

One possibility of electrically connecting the stations to the electronic control system is to run a separate line from the electronic control system to each station (star connection). However, in large conveying systems with many branches this involves very elaborate cabling as many lines run parallel to each other over major distances. According to a preferred embodiment of the invention, the stations of the conveyor are, therefore, connected in parallel to the wires of a line connected to the electronic control system. The desired station is then selected and connected to the electronic control system by means of corresponding signals. With this embodiment, it is sufficient to lay one cable running parallel to the mechanical conveyor.

Figure 2:
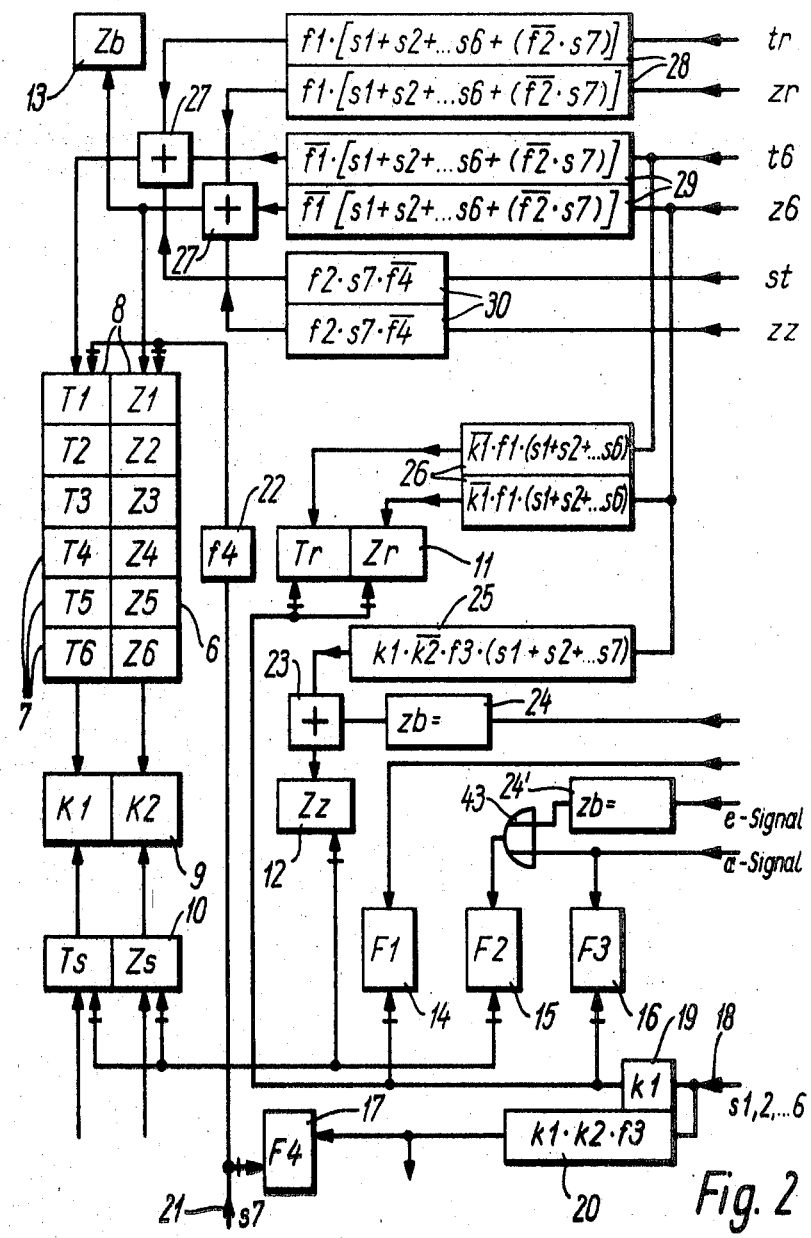
Figure 3:
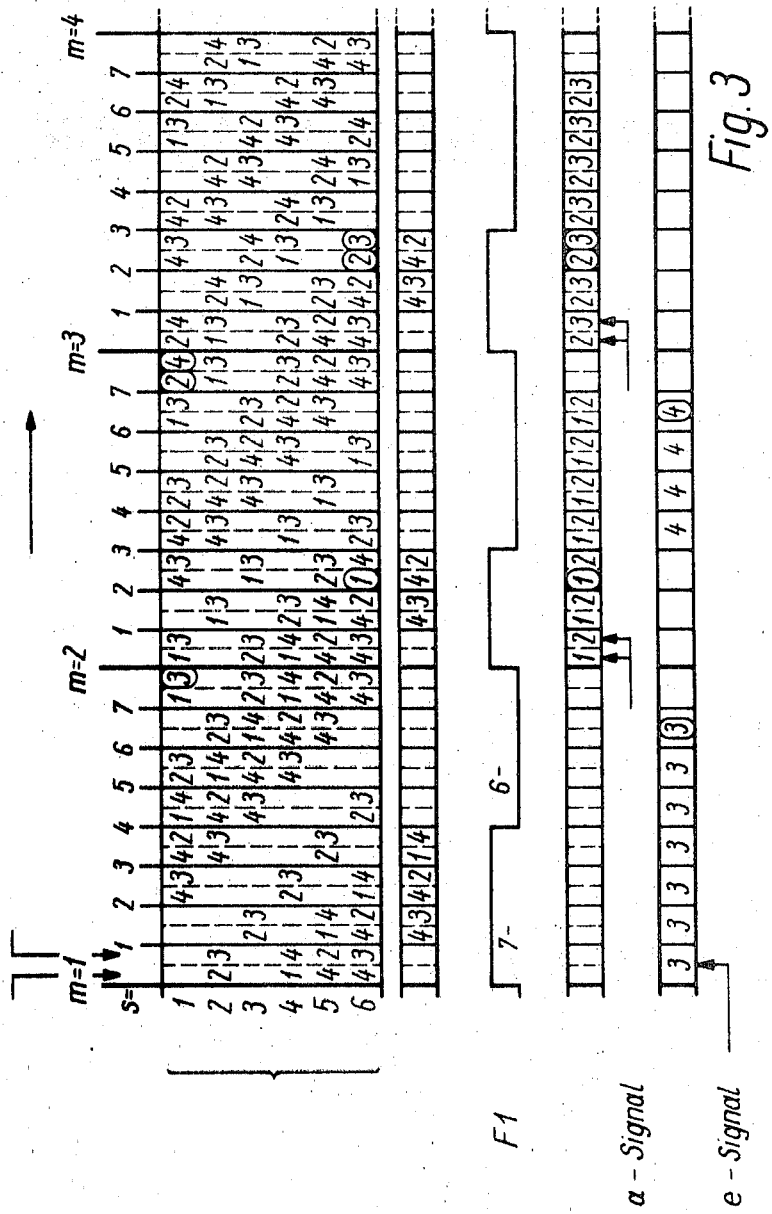
Figure 4:
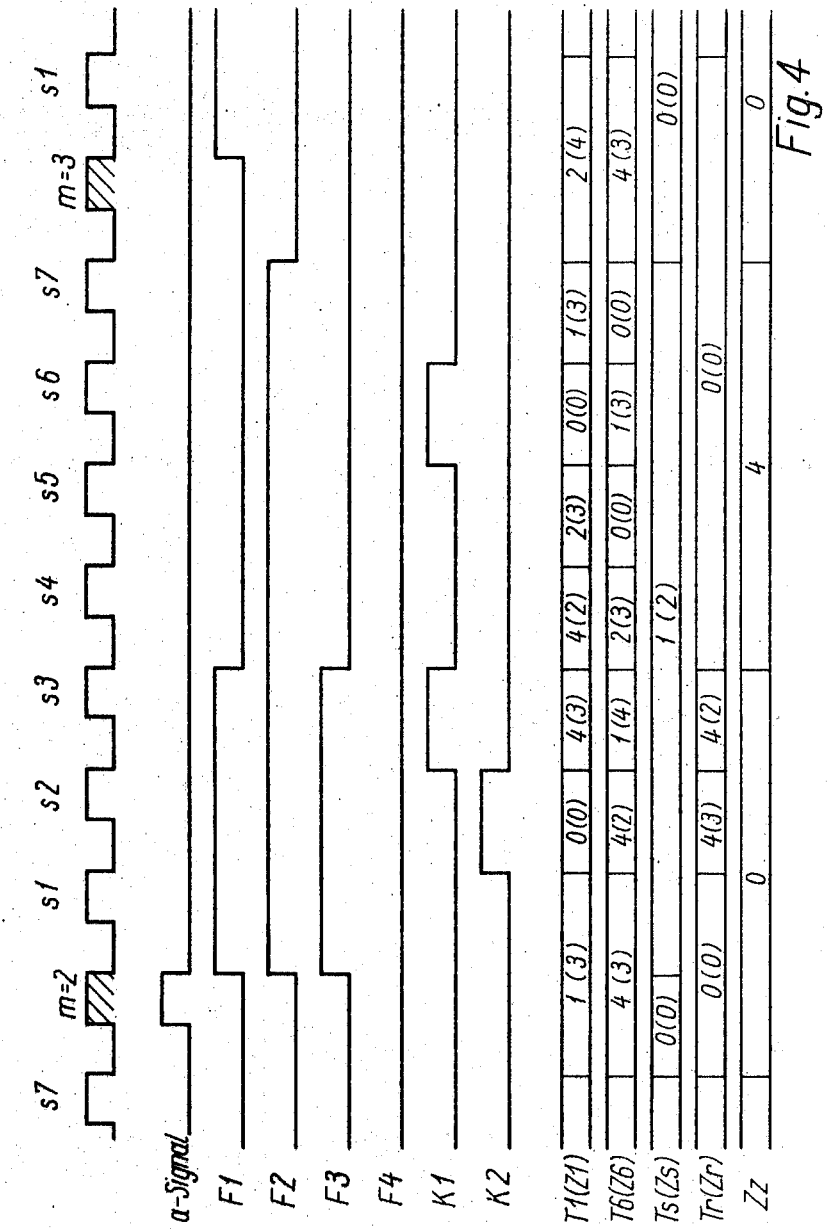
Figure 5:
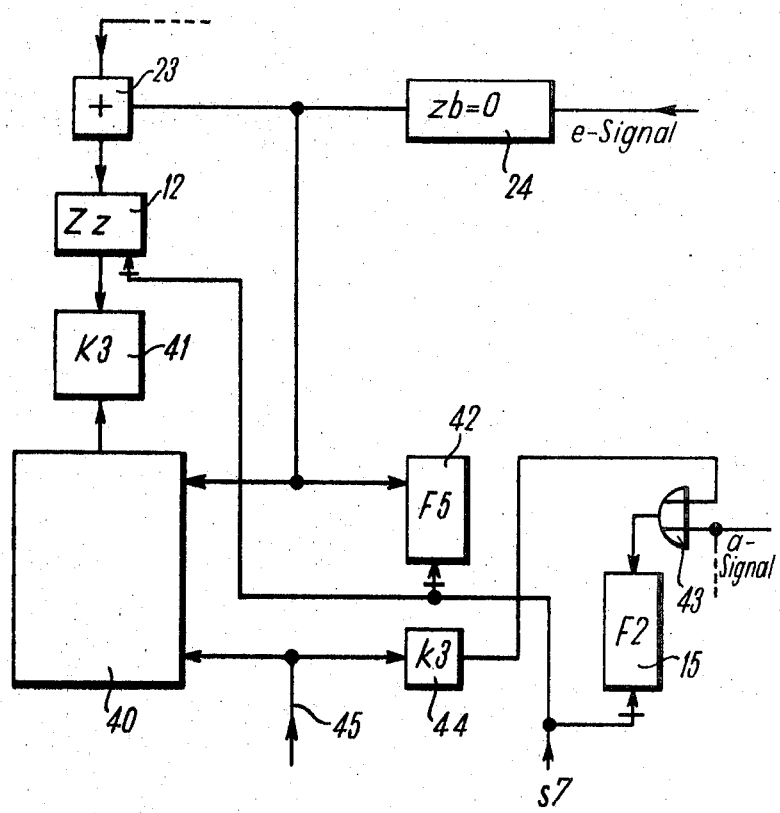
Figure 6:
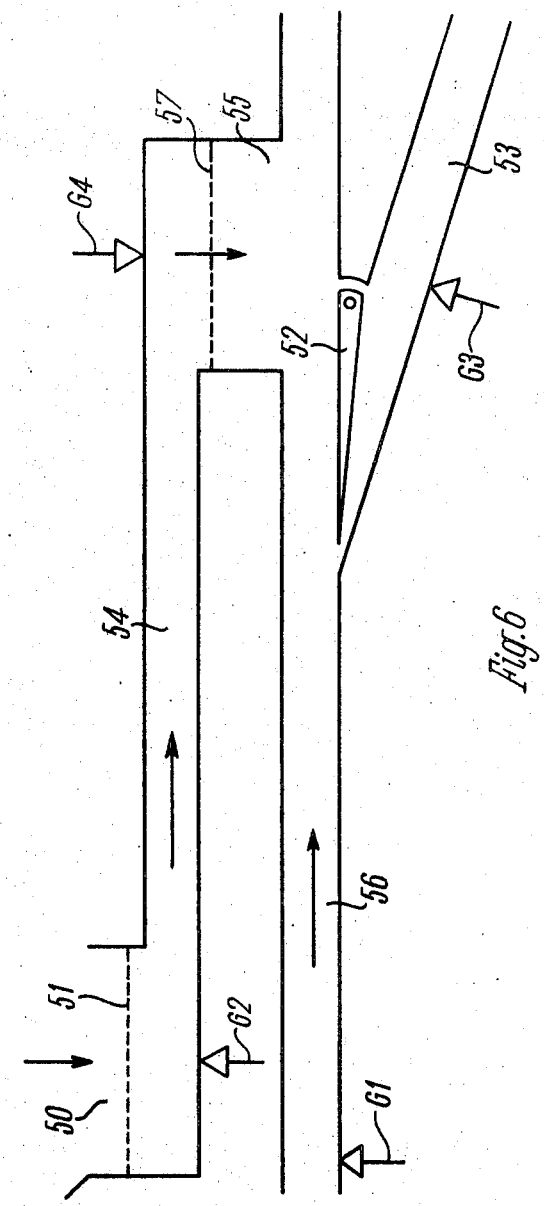
Figure 7:
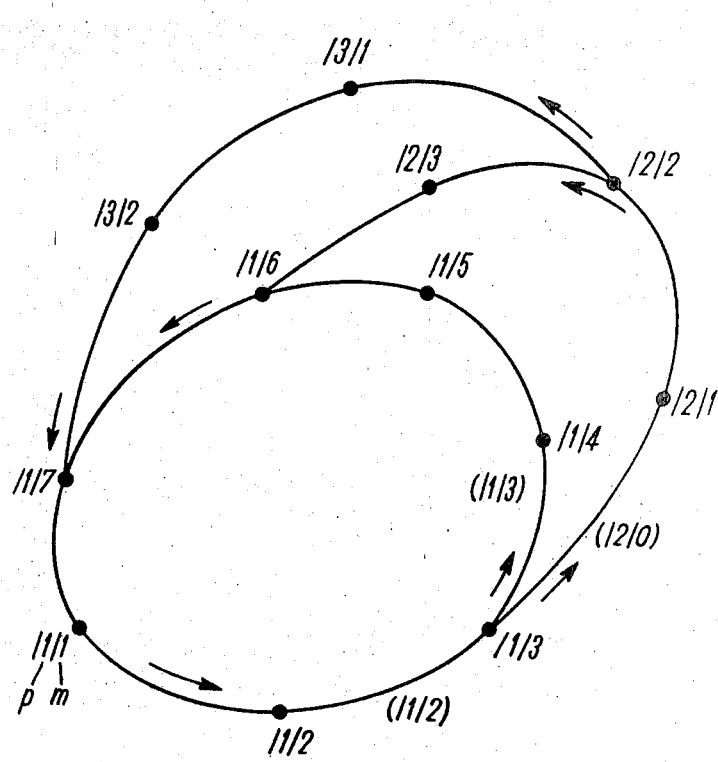
Figure 8:
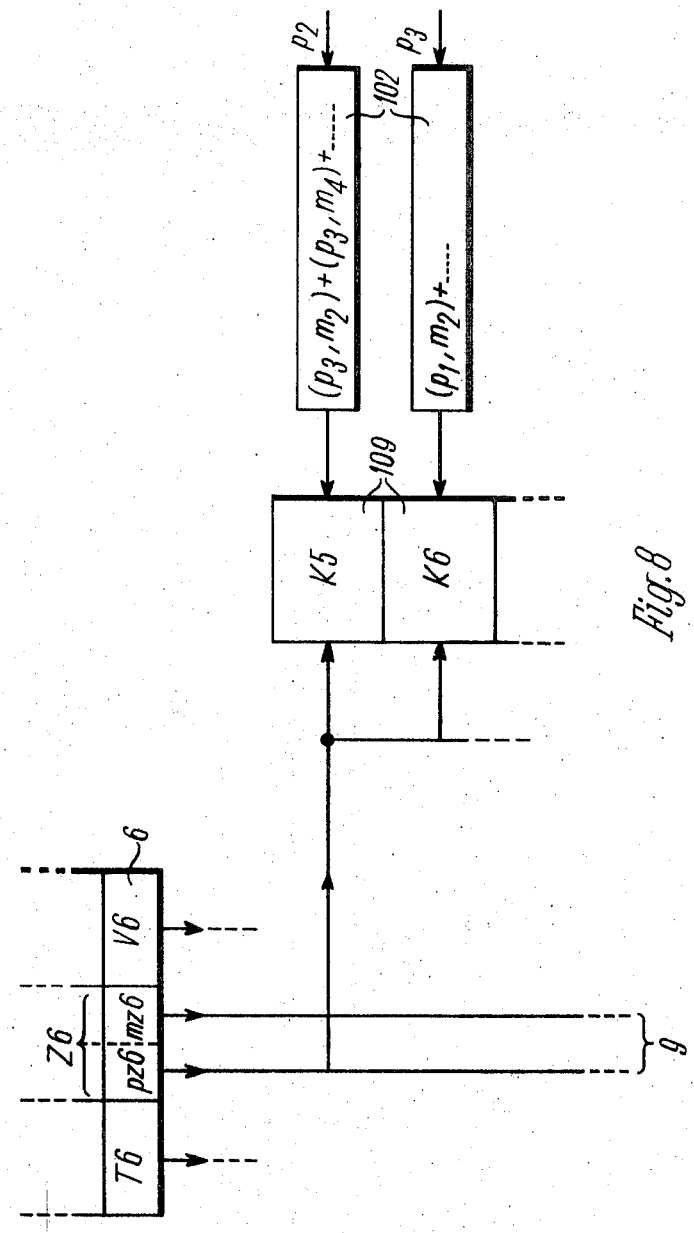
Figure 9:
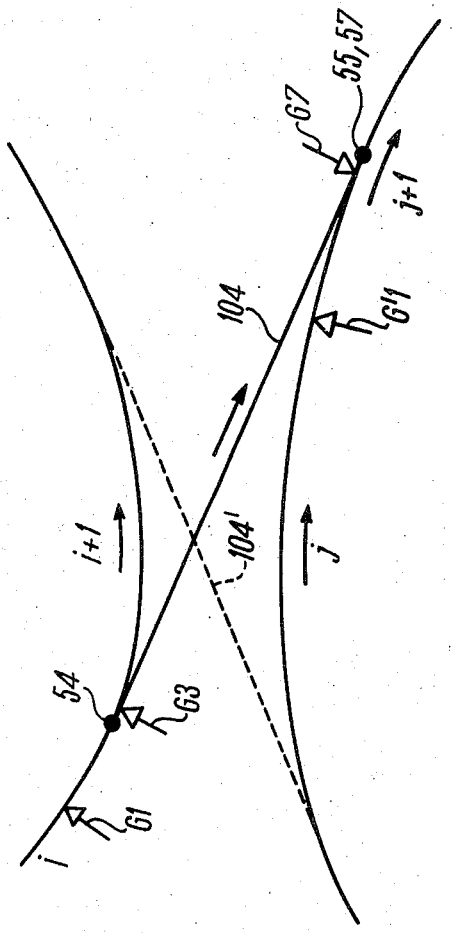
Figure 10:
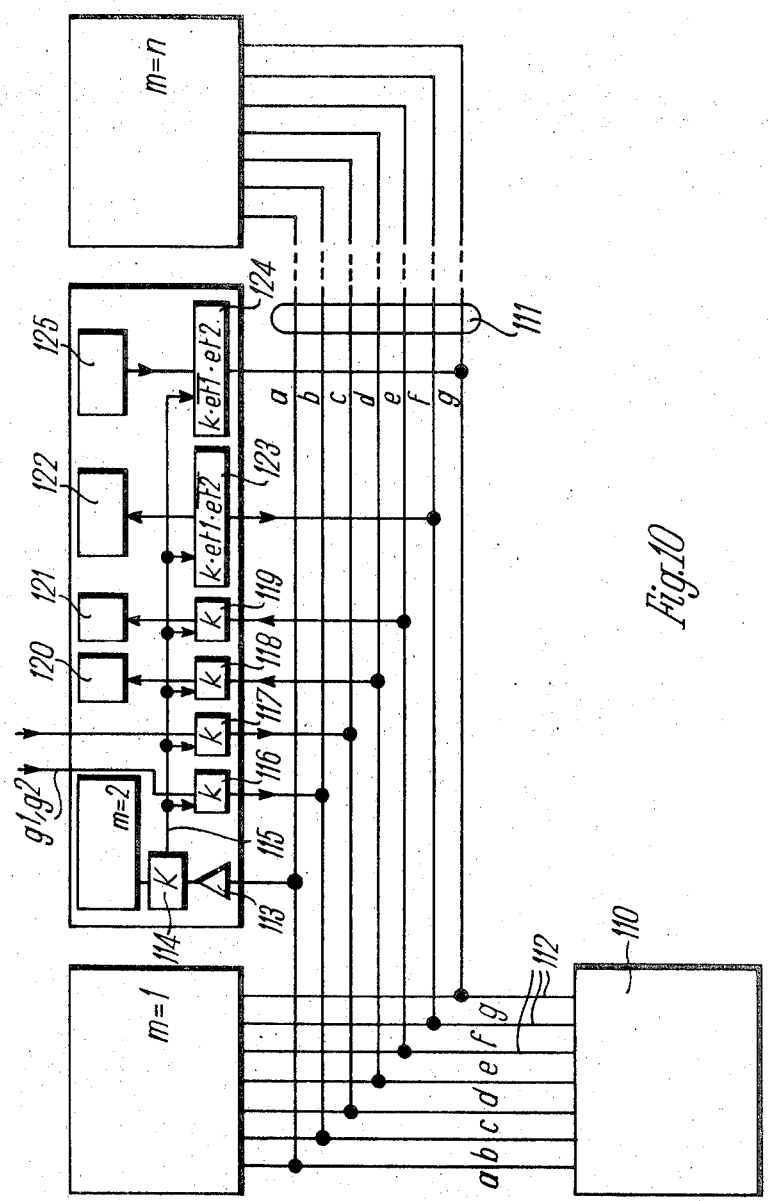
Figure 11:
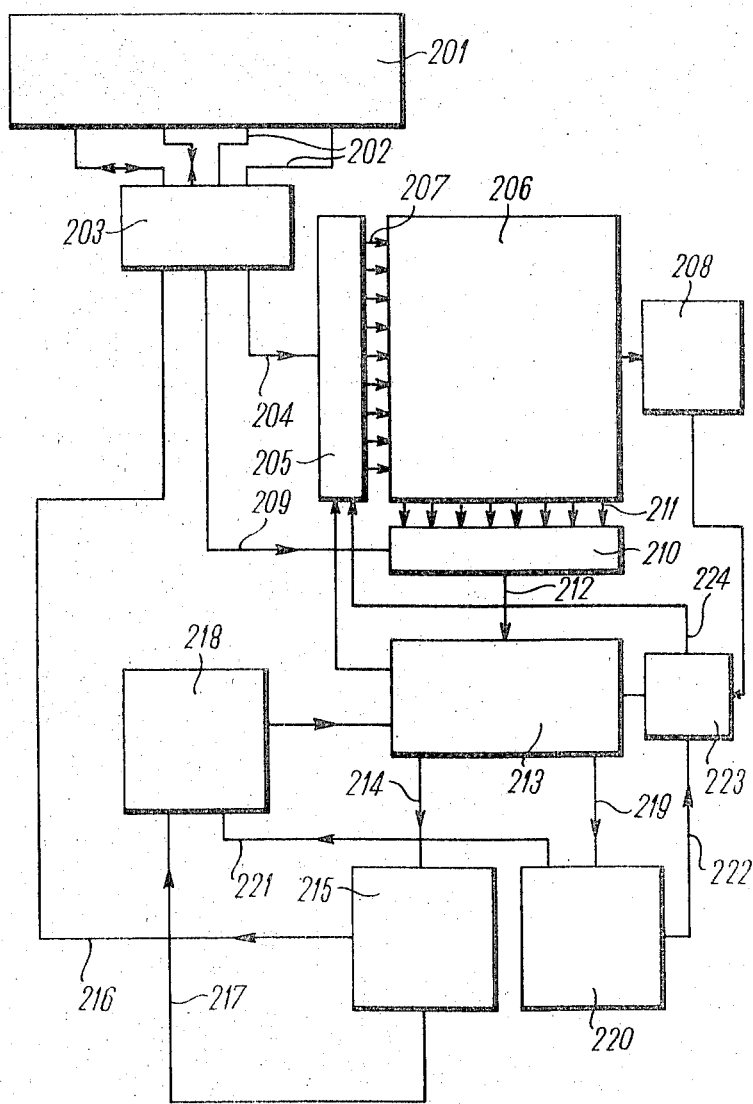

Further details and embodiments of this invention will become apparent from the following description and the accompanying drawing in which FIG. 1 is a schematic representation of a conveying system with four stations and four track sections containing five objects at two successive points in time, FIG. 2 is a function chart of the logic configurations showing the various logic operations, FIG. 3 is an example of the time sequence of information flow to the store, FIG. 4 is a time diagram of the events in station 2 according to FIG. 2, FIG. 5 is a circuit for recognizing and handling identifying tags of non-existent destinations, FIG. 6 is the schematic representation of a feed and discharge station with stand-by track, FIG. 7 is the schematic representation of a system with a plurality of branches and junctions, FIG. 8 is a detail of the logic configuration corresponding to the arrangement in accordance with FIG. 7, FIG. 9 is a schematic representation of the interlinkage between two conveying systems, FIG. 10 is a schematic diagram which illustrates how a station is connected to the electronic control system, and FIG. 11 is a block diagram of a system comprising a store or "memory" with immediate access to all locations.

In the simple system shown in FIG. 1, the conveyor comprises four track sections numbered /1, /2, /3 and /4. At each transition between two successive track sections there is provided a station which may be a feed and/or discharge station. The stations are also numbered, the station numbered /1 being followed, in the direction of conveyance, by the track section numbered /1, then the station numbered /2 and then the track section numbered /2 etc. A simplified system of this type involves the following signals:

A feed signal which signals that a container has been fed into the track, an arrival signal signalling the arrival of a container at a station and a discharge signal which is emitted by the electronic control system when a container has reached its destination and is to be removed from the track. The central shift register of the electronic control system contains the destination information of all containers contained in the conveying system at any one time and, in the same line, the number of the track section or the number of the station located ahead of that track section in the direction of conveyance as position identifying tag. The arrangement of the various items of information in the store provides a key to the number of objects contained in the conveying system and the sequence in which these objects move along the individual track sections.

In principle, the system admits objects of any desired shape. However, in that case expensive arrangements are necessary to ensure that the most varied objects will be gripped reliably. In distributing conveying systems of this kind it is, therefore, common practice to place the objects into containers 4 and to circulate these containers. Apart from protecting the objects against rough handling, this has the advantage that owing to the uniform shape of the containers the conveyor proper and the various sensors and gripping devices may be adapted to suit this consistent shape of the containers. For this reason, the term container will be used throughout the remainder of the present specification, but it shall be understood that this term is equivalent to the term "object" as employed in the preceding part of the specification.

In FIG. 1, no container 4 is located in track section /1, three containers are located in track section /2, one container is located in track section /3 and one container in track section /4 at a specific point in time. The container in track section /4 bears the destination information /1, which means that it is to be discharged at station /1. The container in track section /3 is to be dispatched to station /2 and the containers in track section /2 are to be delivered at stations /4, /3 and /1 respectively. Somewhat later, the containers 4 have reached the positions indicated by the broken lines. In the meantime, the first container in track section /2 with the destination information /4 has passed the station /3. This means that this container now ranks last in track section /3 and that the following container in track section /2 with the destination information /3 has moved to first place within that track section. In the condition shown in full lines in FIG. 1, the shift register associated with the conveying system (not shown in FIG. 1) contains a blank first line, the position identifying tag /4 and the destination identifying tag /1 in the second line, the position identifying tag /2 and the destination identifying tag /1 in the third line, the position identifying tag /2 and the destination identifying tag /3 in the fourth line, the position identifying tag /2 and the destination identifying tag /4 in the fifth line and the position identifying tag /3 and the destination identifying tag /2 in the sixth line, i.e., the last line of this example. Thus, the register indicates that the track section /3 contains a container 4 with the destination /2 and the track section /4 a container with the destination /1. The register also shows that three successive containers bearing the destination identifying tags /4, /3 and /1 are located in track section /2. When the container 4 with the destination identifying tag /4 passes the station /3, this information is removed from the shift register and a new item of information is entered into the input of the shift register. This new item of information again includes the destination identifying tag /4 while the position identifying tag /2 has been converted to the position identifying tag /3 in order to indicate that the container is now located in track section /3. At the moment in which the containers assume the positions indicated by the broken lines in FIG. 1, the shift register contains the following information:

3,4; 4,1; 2,1; 2,3; 3,2.

In this example, the line contents are given in the direction of information flow, starting with the first line and proceeding to the sixth line, with the position identifying tag always preceding the destination identifying tag.

In FIG. 1, the direction of conveyance is indicated by an arrow 1. The track section numbers are preceded by a / and the stations 3 are represented by pentagons enclosing the respective numbers. The containers 4 move along the track sections in the direction of the arrow 1.

FIG. 2 illustrates the logic configurations of the functional groups cooperating with a shift register 6. In the example shown, the shift register 6 has six successive lines or levels 7 which advance their information content into the next line in response to each shift timing pulse. The first line is connected to an input and the last line to an output. Apart from these connections, the lines 7 have no other external connections. The sixth line 7 is connected to the output, the first line 7 to the input of the shift register 6. In the example shown, the shift register 6 has two columns 8. The one column contains the specified position identifying tags which are designated by the letter T. The other column contains the destination identifying tags Z. Both the position identifying tags T and the destination identifying tags Z additionally comprise the line number of the corresponding line 7.

Thus, an output of the shift register may be connected to an input of the shift register. Furthermore, the output of the shift register 6 has connected to it a comparator 9 for the position and destination identifying tags. The comparator, in turn, has connected to it a search store 10 which is connected to a search detector which, upon entry of an object into a station, signals the identifying tag up that station as destination tag and the identifying tag of the station or track section passed by the object prior to such entry as position identifying tag. The "yes" output of the comparator is connected to a pulse emitter which sends a discharge signal to the station concerned and also furnishes an erase signal for the relevant information in the shift register and in the search store. In addition, the electronic control system includes a destination store which is connected to an input of the shift register and whose destination identifying tag, upon transfer of an object from a station into the next track section, is entered as destination identifying tag together with the identifying tag of that station, the latter tag being used for position identification. The column K1 of the comparator 9 is connected with the sixth line 7 of the shift register 6 containing the position identifying tag, while the column K2 of the comparator 9 is connected with the sixth line 7 of the shift register 6 containing the destination information. Two columns, which again accommodate a position and a destination identifying tag, are also provided in the search store 10. The comparator 9 furnishes two different output signals, depending on whether only the position identifying tags or both the position and destination identifying tags of the sixth line 7 of the shift register 6 and the search store 10 coincide.

In this specification, the station numbers, the track section numbers and the position and destination identifying tags are marked with oblique strokes preceding the corresponding numerals. However, in the accompanying drawing, these oblique strokes are usually omitted.

A further advantage of such a system consists in that the contents of the store or "memory" may be printed in a form which shows which object is located where at that specific time. Thus, in the event of a failure of the mechanical part of the system, the objects may be removed from the track and delivered by other means since the destination information allocated to each object is known.

The input of a further single-line store, i.e., a feedback store 11 which has the same number of columns as the shift register 6, may be connected to the sixth line 7 of the shift register 6. By connecting the feedback store to the shift register 6 the number of lines of the latter can be increased by one. From the feedback store 11, the information is returned to the input, i.e., the first line 7, of the shift register 6.

In addition, a destination store 12 is provided which has one line and one column. A destination tag is entered into the destination store 12 when an object is fed into the conveying system or else the destination store 12 receives a destination information from the corresponding column of the sixth line 7 when the comparator 9 determines a coincidence between the position identifying tags in the sixth line 7 of the shift register 6 and the corresponding column of the search store 10, but no coincidence of the corresponding destination identifying tags. This is the case when a container entering a station shall not be discharged but move on. The destination tag of that container is temporarily stored or "buffered" in the destination store 12 until it enters the next track section.

To avoid misunderstandings, we would point out that a column in a store is not equivalent to a capacity of one bit but has a capacity which is sufficient to accommodate a word consisting of a plurality of bits. For example, if the identifying tags consist of words composed of eight bits each, then a column will accommodate eight bits in one line. Thus, each of the columns mentioned may be subdivided into any desired number of columns. It is merely for the sake of simplicity that the columns are represented in the form chosen for the purposes of this specification. It shall also be understood that the various items of information are contained in the columns in the binary code and that a comparison of two columns will yield coincidence only if all bits of the words to be compared coincide.

An "occupied" store 13 is connected to the first line 7 of the shift register 6. It is sufficient to connect the "occupied" store 13 to one of the two columns 8 of the shift register 6, because the two columns 8 simultaneously either contain an item of information or do not contain an item of information. The "occupied" store 13 checks whether the first line 7 of the shift register 6 is free. A signal can only be entered into the shift register when the "occupied" store 13 has verified that the first line 7 of the shift register 6 is free.

Four bistable logic elements designated F1 ... F4 are provided to control the store arrangement described and to achieve the desired logic operations. These logic elements, which are preferably flip-flops, include a level change-over switch 14, an input switch 15, a destination store switch 16 and an erasing switch 17. The level change-over switch 14 is set with each station scanning timing pulse. In this position of the level change-over switch 14 the feedback store 11 is connected to the sixth line 7 of the shift register 6. Practically, the number of lines of the shift register is thereby increased by one since the information in the feedback store 11 is returned to the input of the shift register. The level change-over switch is reset into its other position when that part of the comparator 9 which compares the position identifying tags in the last line of the shift register 6 and in the search store 10 signals coincidence. This is, for instance, the case when the search store contains no information because no container is fed in or arrives at the station being scanned and when the last line of the shift register 6 contains a blank. This causes the level change-over switch to be reset and the feedback store 11 to be disconnected with the result that the blank disappears. What is achieved thereby is that the various items of information in the shift register 6 are "condensed" so that the shift register 6 may be fully utilized and no storage capacity is blocked by blank lines between the various items of information. In the logic equations the condition in which the level change-over switch 14 is set is described by $f1$, the other condition by $f1$. The level change-over switch 14 is also reset and the feedback store 11 thus disconnected from the output of the shift register 6 when the position identifying tags in the last line 7 of the shift register 6 and in the search store 10 coincide, i.e., when an object arrives. The information corresponding to that object is thereby removed from the store in the same way as previously the blank line. If the arriving object is a container which is to be discharged, coincidence also exists between the destination indentifying tags in the last line 7 of the shift register 6 and in the search store 10. In that case the container is discharged and the corresponding information erased completely. If, on the other hand, the arriving container is one with a different destination address, i.e., a container which shall continue on its way through the system, then the destination identifying tag is transferred to the destination store 12 before the relevant information is completely erased and this destination identifying tag is then reentered into the first line of the shift register 6, together with the position identifying tag from the search store, in response to the last shift timing pulse.

The input switch 15 is set either when an arrival signal is emitted by the sensor of the station, which indicates that a container is entering into the station, or when a container is fed into the station and the "occupied" store 13 is empty at the same time. Resetting of the input switch 15 is always effected by the last shift timing pulse of a station scanning interval.

The destination store switch 16 is set by the arrival signal of the sensor or detecting element provided at the station. The destination store switch 16 is reset by a shift timing pulse when that part of the comparator 9 which compares the position identifying tags signals coincidence.

The erasing switch 17 is set when the discharge mechanism of the station is actuated, i.e., when the comparator 9 determines coincidence of the position and destination identifying tags and when the destination store switch 16 is simultaneously set by an arrival signal. Resetting of the erasing switch 17 is always effected by the last of the shift timing pulses.

The timing pulses, whose grid will be described later, are cyclic. They start with a station scanning pulse which connects the electronic control system to the station to be scanned. The station scanning pulse is followed by $(i + 1)$ shift timing pulses, $i$ being equal to the number of lines 7 of the shift register 6. The last shift timing pulse is again followed by a station scanning pulse which disconnects the scanned station from the electronic control system and connects the next station. The shift timing pulses, designated $s1 \ldots s7$, are led to a gate circuit 19 and a gate circuit 20 via a timing pulse line 18. The gate circuit 19 is in the conducting state when that part of the comparator 9 which compares the position identifying tags (K1) emits a "yes" signal because the position identifying tags coincide. In the conduction state of the gate circuit 19, the pulses are applied to the resetting inputs of the destination store switch 16 and the level change-over switch 14 and to the reset input of the feedback store 11. The information in the feedback store 11 is thereby erased and the switches 14 and 16 are reset. If, apart from the position identifying tags, the destination identifying tags which the comparator 9 compares coincide as well and if, in addition, the destination store switch 16 is in the set position, then the shift timing pulse from the timing pulse line 18 is also applied to the setting input of the erasing switch 17 and additionally initiates the discharge of the container which enters the scanned station at that time. The last shift timing pulse $s7$ is applied through a line 21. Apart from advancing the shift register 6 by one step, this shift timing pulse also resets the erasing switch 17 as well as the level change-over switch 14 and the input switch 15 with its trailing edge. In addition, this pulse erases the information in the destination store 12 and in the search store 10. Finally, the shift timing pulse $s7$ erases the information in the first line 7 of the shift register 6 if a gate 22 is open, which is only the case when the erasing switch 17 is in the set position. Since the erasing switch 17 is only reset by the trailing edge of the shift timing pulse $s7$, the gate 22 is open at the time the shift timing pulse $s7$ arrives.

The input of the destination store 12 is preceded by an OR gate 23 which has two inputs: Connected between the one input and the destination feed signal there is a gate 24 which is in the conducting state when the "occupied" store 13 furnishes no "occupied" indication, thus indicating that the first line of the shift register 6 is free. The other input of the OR gate 23 is preceded by a gate 25 to which the destination identifying tags from the sixth line 7 of the shift register 6 are applied and which is in the conducting state when the following conditions are fulfilled: Comparator K1 yes, comparator K2 no, destination store switch 16 set, one of the shift timing pulses $s1 \ldots s7$ being applied.

The input of the feedback store 11 is connected to the sixth line 7 of the shift register 6 by means of two lines. These lines incorporate a double gate 26 which passes the information when K1 of the comparator 9 fails to show coincidence, when, simultaneously, the level change-over switch 14 is set and, in addition, one of the shift timing pulses $s1 \ldots s7$ is being applied.

The "occupied" store and the erase signal line from the gate 22 are connected directly to the corresponding inputs of the shift register 6. The information to be entered into the shift register 6 must pass one OR gate 27 each, which gates precede the inputs of the two columns 8 of the shift register 6. Each of the two OR gates 27 has three inputs. To the one input, the information from the feedback store 11 may be applied via a double gate 28. The double gate 28 is in the conducting state when the level change-over switch 14 is set and when, in addition, one of the shift timing pulses $s1 \ldots s6$ is being applied or when, instead of one of the shift timing pulses $s1 \ldots s6$, the shift timing pulse $s7$ is being applied and, simultaneously, the input switch 15 is in the reset position.

Another input of the OR gate 27 has connected to it a double gate 29 through which the information from the sixth line 7 of the shift register 6 is applied. The conditions under which the double gate 29 is open are the same as those for the double gate 28, except that the level change-over switch 14 must not be set but reset. Since the level change-over switch 14 assumes only two positions, this ensures that either the information from the sixth line 7 or the information from the feedback store 11 reaches the OR gates 27. The third input of the OR gates 27 is connected to the output of the destination store 12 or a station number emitter (not shown) via a double gate 30. The double gate 30 is open when the input switch 15 is set, when, in addition, the shift timing pulse 7 is being applied and when, finally, the erasing switch 17 is in the reset position.

FIG. 3 shows an example of the timed sequence of information flow in the stores. The station to be scanned is connected to the electronic control system by the station scanning timing pulse. In the example shown, the position assumed by the various items of information in the columns of the shift register reflects the situation existing between the first station advancing pulse and the first shift timing pulse. According to this example, the third line, for instance, is a blank line. Likewise, the first line is a blank line, because no new information was entered into this line at the previously scanned station. The level change-over switch 14 was set with the station scanning timing pulse. Consequently, the feedback store 11 is connected to the sixth line of the shift register. On completion of the first shift timing pulse, all items of information have moved on by one line. The information from the feedback store has moved into the first line of the shift register, while the information from the sixth line of the shift register 6 has moved to the feedback store. After the third shift timing pulse, the sixth line contains a blank. Since the search store also contains a blank because no arrival signal is being applied from the corresponding detection element or sensor of the station /1, the comparator 9 determines coincidence of the position identifying tags. As a result, the gate circuit 19 becomes conducting and the next shift timing pulse, i.e., the fourth shift timing pulse, flips the level change-over switch 14 back into the reset position. The result is that the blank information from the sixth line of the shift register is not returned to the input of the shift register. Practically, this means that the shift register together with the feedback store has 7 lines when the level change-over switch 14 is set and that the two stores together have 6 lines when the level change-over switch 14 is reset. In the example shown, an object bearing the destination identification /3 is fed into the station /1 during the station scanning interval, i.e., during the time between the first station scanning timing pulse and the second station scanning timing pulse. This destination identifying tag is entered into the destination store 12 and transferred to the first line of the shift register 6 together with the identifying tag of this station of the following track section, which has the same identifying tag, as position identifying tag at the time of the last shift timing pulse. Since the empty feedback store is connected to the input of the shift register by the station scanning timing pulse, the first line will contain a blank after the first shift timing pulse. Since the number of shift timing pulses received during the station scanning interval exceeds the number of lines of the shift register 6 by one, this blank will again appear in the first line after the seventh shift timing pulse so that a new item of information may be entered with the seventh shift timing pulse $s7$.

The station scanning timing pulse following upon the shift timing pulse $s7$ disconnects the station /1 from the electronic control system and connects the station /2. During this action, no change occurs in the contents of the store and its position. Taking the station /2 as an example, FIG. 3 illustrates what happens upon arrival of a container with a destination other than station /2. An arrival sensor of the station /2 furnishes an a-signal which signals the arrival of an object at the station. An item of information composed of the identifying tag of the preceding station as position identifying tag and the identifying tag of the station scanned as destination identifying tag is then entered into the search store in a manner still to be described. After the second shift timing pulse the sixth line of the shift register contains the information 1,4, i.e., the position identifying tag /1 and the destination identifying tag /4. This means that the position identifying tag in the sixth line of the shift register coincides with the position identifying tag in the search store, while the two destination identifying tags do not coincide. Since the position identifying tags coincide, the level change-over switch 14 is reset with the following third shift timing pulse $s3$. Simultaneously, the destination information from the sixth line of the shift register is thereby entered into the destination store. The following events proceed as previously described. With the seventh shift timing pulse, the identifying tags in the search store and in the destination store are entered into the first line of the shift register 6 as new position and destination identifying tags respectively.

In the following, the discharge of an object will be described by taking the station /3, i.e., the next station to be scanned, as an example. The arrival sensor of the station /3 signals the arrival of the container by emitting an a-signal. The a-signal causes the identifying tag of the preceding station to be entered into the search store as position identifying tag and the identifying tag of the station scanned as destination identifying tag. After the second shift timing pulse $s2$, the comparator 9 determines coincidence between the position and destination identifying tags of the last line of the shift register 6 and the search store 10. The result is that on the one hand a discharge pulse is released which initiates the mechanical operation by which the container is discharged at the station and that, on the other hand, the level change-over switch 14 is reset as previously described on several occasions, whereby the information corresponding to the container is simultaneously caused to disappear. The destination store contains no signal and no new information is applied to the input of the shift register 6 with the seventh shift timing pulse.

The dimensioning of the timing grid is subject to the following considerations. In the time during which the conveyor belt is displaced by a distance corresponding to the prescribed minimum distance between two successive containers, i.e., a "container gap," all stations of the system must be scanned once to make sure that no event occurring at any station can escape coverage by the electronic control system. If it is assumed, for the sake of simplicity, that the time intervals between the individual shift timing pulses have the same duration as those between the last shift timing pulse and the station scanning timing pulse on the one hand and the station scanning timing pulse and the first shift timing pulse on the other hand, then the frequency of the clock or timing pulse generator is equal to the product of the number of stations multplied by the number of lines of the shift register increased by two and multiplied by the belt speed and divided by the minimum clearance between two containers.

For example, if a distributing conveyor has twenty stations which must be cyclically scanned and if the conveyor speed is 1 m/sec and if the minimum clearance between successive containers is limited to 4 cm, then the "gap signal" has a duration of 40 msec. Within these 40 msec, all of the 20 stations must be scanned. In this case, a suitable duration for the station scanning interval is a time of 2 msec. If the shift register has 48 lines, which means that 48 containers may be contained in the system simultaneously, then the distance in time between two shift timing pulses is 40 $\mu$sec. This time interval of 40 $\mu$sec gives a timing pulse frequency of 25 kHz. If one considers that timing pulse frequencies of 1 MHz are common practice today and that much higher timing pulse frequencies still present no technical problems, it will be apparent that even with large systems comprising many stations and a shift register with a multiplicity of lines all stations can be scanned once during the "container gap" and the entire contents of the shift register cycled once during each station scanning cycle without any difficulty.

Although only one blank line can be removed from the shift register during one station scanning interval so that it may happen that an "occupied" condition is signalled during a station scanning cycle although the shift register still contains one or more free lines, this is not important in view of the fast speed at which the station scanning intervals succeed each other. As all stations are scanned within 40 msec for example, and, even under most adverse conditions, a free line is available after all stations have been scanned two or three times at the latest as long as the shift register still contains a free line, this condition will not appreciably affect the operation of the system. Even if all stations would have to be scanned several times before a free line appears at the input of the shift register, the time required for this procedure would not amount to more than a fraction of a second and would, therefore, not be noticeable.

The time diagram of all these functions of the various stores, switches and comparators is shown in FIG. 4 for the passage of a container through the station /2 in accordance with FIG. 3. In the first line, which represents the timing pulses, the station scanning timing pulse by which the station /2 is connected to the electronic control system is designated m2. The shift timing pulses are designated s 1 ... s7. The lower five lines show the information contents of the corresponding lines of the indicated stores. The first number represents the position identifying tag and the number added in parantheses stands for the destination identifying tag. In the last line, which represents the destination store, only the destination identifying tags have been entered. The point which marks the beginning of the time during which the information is contained in the corresponding line of the store is represented by the left-hand border line of the field in which the information has been written. As is apparent from FIG. 4, all switching operations are synchronized with the trailing edges of the various timing pulses.

To avoid errors owing to wrong destination inputs, a comparatively slight extension of the circuitry is necessary, which is shown in FIG. 5. The core of this arrangement is a circuit group 40 which causes all destination identifying tags contained in the system to appear successively at its output in response to a starting pulse. In the same manner as previously described, the destination input is effected by means of an e-signal applied through the gate 24 to the OR gate 23 and on to the destination store 12. The destination identifying tag stored in the destination store 12 is compared with the destination identifying tags at the output of the circuit group 40 by means of a comparator 41 connected to the output of the destination store 12.

In addition, a destination tag switch 42 is provided in the form of a bistable logic element, preferably a flip-flop. The destination tag switch 42 is set by the e-signal when this has passed the gate 24. After passing the gate 24, the same signal also starts the circuit group 40 which then starts to successively generate the valid destination identifying tags at its output. The destination tag switch 42 is reset by the last shift timing pulse s7.

The input switch 15 is set when the comparator 41 determines a coincidence between the destination identifying tag in the destination store 12 and a destination identifying tag at the output of the circuit group 40. To this end, the setting input of the input switch 15 is connected to a gate 44 via an OR gate 43 and a counting pulse is applied to said gate 44 through a line 45. The counting pulse applied through the line 45 also controls the function by which the circuit group 40 is advanced from one destination identifying tag to another. The frequency of the counting pulse on line 45 is so high that the checking operation is definitely completed before the last shift timing pulse of the station scanning interval so that at the time of the last shift timing pulse the decision as to whether the entered destination identifying tag is admissible or not is already available. If the input switch 15 is set because the comparator 41 has determined the existence of a coincidence, the destination identifying tag may be transferred from the destination store 12 to the shift register 6. If no coincidence is determined during the checking operation, the input switch 15 remains in its reset position and the wrong destination identifying tag which was entered when the container was fed into the system cannot be transferred from the destination store 12 to the shift register 6. Instead, a collective destination tag is entered into the shift register 6 together with the corresponding position identifying tag. To this end, the collective address is constantly applied on a line (not shown) provided for the purpose and this line is connected to a further input of the OR gate 27 for the destination identifying tag via a gate circuit. This gate incorporated in the line with the collective destination tag is in its conducting state when the input switch 15 is reset, when the destination tag switch 42 is simultaneously set and when, in addition, the erasing switch 17 is not set and, finally, the last shift timing pulse of the station scanning interval is being applied. Alternatively, a locking signal may be provided in a simple manner instead of entering a collective destination tag. Through a gate circuit meeting the requirements just described this locking signal causes the station at which the wrong destination identifying tag was entered to be locked so that the conveying system will accept no container at this station as long as the destination identifying tag has not been corrected. However, in practical applications embodying this invention the feed point of a station will normally be locked and will only be unlocked if no locking signal appears, i.e., if the destination tag has been recognized as correct.

For the purposes of the preceding description of a simplified embodiment of a conveyor in accordance with this invention it has been assumed that a container is actually fed into the system whenever a destination identifying tag is entered into the store. It has also been assumed that the container is actually removed from the track upon reaching its destination. Disturbances may occur if these conditions are not fulfilled. To eliminate such disturbances and to make the system "foolproof," a certain extension of the electronic control system is necessary which will now be described together with the stations. According to the schematic representation in FIG. 6, a station has a feed opening 50 for the containers which is provided with a removable lock 51. In its simplest form, the lock 51 is immediately followed by the transition to the conveying track. Furthermore, the station is provided with an operable switch 52 whose tongue end points in the direction of the arriving object. The switch 52 consists of a pivoted bow which, when swivelled into the line of transport, forces an arriving container to move into a side track 53. Each station is provided with a plurality of detecting elements which determine whether a container is located at the point where the respective detecting element is installed. Such detecting elements may be designed for photo-electric, inductive, capacitive or mechanical action. A first detecting element G1 located upstream of the station at the line of transport signals the arrival of a container on the track to avoid collision between the arriving container and a container being fed into the system. A further detecting element G2 is provided adjacent to the lock 51. This detecting element G2 checks the feeding of containers to the system. In the vicinity of the switch 52, the side track 53 is provided with a detecting element G3 which checks whether a container has moved into the side track. In addition, the detecting element G3 indicates whether the side track is free or occupied. Adjacent to the detecting element G2 there may be provided a stand-by track 54 which leads to a transfer position 55 which is the transition proper to the line of transport 56. The transfer position 55 is provided with a removable lock 57. In addition, a further detecting element G4 is provided at the transfer position 55. The detecting element G4 checks the transfer of a container from the stand-by track to the line of transport. Feeding a container into the conveying system involves the following operations: First, the container is placed in the locked feed opening 50. Its destination identifying tag is entered by means of a dial (not shown) or a key of a keyboard. Then the feeding operation proper is initiated by actuating a feed-in key. The lock 51 is unlocked thereby and the container enters the stand-by track 54 where it remains until the lock 57 is removed. The detecting element G1 detects the arrival of containers on the line of transport 56. A fed-in container is admitted to the conveying system by opening the lock 57 when the detecting element G1 signals that the line of transport 56 is free. Acceptance of the container by the line of transport is checked by the detecting element G4. The lock 57, the transfer position 55 and the detecting element G4 are omitted at stations which are not equipped with a stand-by track 54. In that case the feed opening 50 admits the containers directly to the line of transport. With the first station scanning function following upon the operation of a feedin key, the selected destination identifying tag is entered into the destination store 12 unless the shift register is packed to capacity, i.e., the "occupied" store 13 must emit a "free" signal. In addition, the identifying tag of the following track section, which is the same as the identifying tag of the station being scanned, is entered into the search store as position identifying tag. The shift register 6, the comparator 9, the search store 10 and the feedback store 11 are provided with an additional column to accommodate a special information. This special information is initially stored in the corresponding additional column of the store and indicates that the corresponding container has not yet been fed into the actual line of transport 56. This is followed by the destination tag check. If this check yields a positive result and if the line of transport 56 is free in the region of the detecting element G1, which is indicated by the fact that G1 emits no arrival signal for several seconds, the lock 51 or, in the case of a station equipped with a stand-by track, the lock 57 is unlocked and the container moves into the line of transport 56. To confirm that the container has been fed in during the unlocking interval, the detecting element G2 or, in the case of a station equipped with a stand-by track 54, the detecting element G4 now emits the $e$-signal proper, i.e., the fee signal, which causes the previously mentioned special information to be erased again, thus indicating that the container is now actually in the line of transport.

If the feed-in key of a station is actuated while no container is in the feed opening, no signal is generated by G2 during the unlocking interval. In that case not only the special information but all other information relating to the container as well is erased again at the end of the unlocking interval.

Like the feeding operation, the discharge operation is also checked by a detecting element. An object may only be discharged if the space in the side track 53 ahead of the detecting element G3 is still free. If a container reaches its destination, but cannot be ejected because the side track 53 is occupied, the switch 52 must not be operated as this would cause a collision. In that case the container is recirculated through the line of transport 56 until it again reaches the station which is its destination. Discharge of a container which has reached its destination is also prevented if the distance between that container and a preceding or following container is too small so that disturbances are likely to occur upon discharge. The spacing of containers may be checked by means of timing elements in conjunction with the signals emitted by the detecting element G1.

The feed stations are provided with a lock 51. When this lock is released, the containers are directly admitted to the line of transport 56. However, in many cases it is advisable to provide the stations with a stand-by track 54 as shown in FIG. 6. Feeding a container into the conveying system at a station equipped with a standby track involves the following operations:

The container is fed into the feed opening 50 and its destination is entered into the destination store 12 by means of a dial and key. However, this feeding operation will only take place if the detecting element G2 emits a $g2$-signal to show that at least one place is still free in the stand-by track. The destination input to the destination store 12 initiates the known checking procedure. If the destination identifying tag is valid, the destination tag switch 42 is set. With the last shift timing pulse of the station scanning interval the destination identifying tag, together with the position identifying tag and the $e$-index, is entered into the shift register 6. At the same time, the lock 51 opens the access to the stand-by track 54. At the end of the unlocking signal for the lock 51 (ere1) a check is made to determine whether the container has actually been fed in, which is verified by the detecting element G2. If G2 confirms that the container has been admitted to the system, a search for the corresponding container information is initiated in the known manner. the e-index is then erased by temporary storage or "buffering" of the destination identifying tag. With the last shift timing pulse, the destination identifying tag is reentered together with the new position identifying tag and a further index, viz. the stand-by index $w$.

If G2 fails to confirm admittance of the container to the conveying system during a feeding operation, a search is performed and the destination identifying tag is "buffered" also in this case, but the container information is not reentered into the store because the input switch 15 has not been set so that the corresponding container information is erased.

In the stand-by track 54 the containers move up in the direction of the transfer position 55. As soon as the detecting element G4 signals a waiting container, a transfer operation is initiated by briefly unlocking the lock 57 if no passing container is contained in the line of transport 56 between the detecting element G1 and the transfer position 55. At the beginning of the corresponding unlocking signal era2, a search is again started for the corresponding container information which is characterized by the first $w$-index arriving in the shift register 6. This is again followed by a "buffering" and reentering operation during which the stand-by index $w$ is erased and the container information provided with a transfer index $U$. In addition, this reentering operation moves the information corresponding to the container back to its proper position in the shift register in which the proper sequence of the various items of information is ensured.

If the detecting element G4 then confirms admittance of the container to the conveying system, a search for the corresponding container information with the U-index is initiated with the end ere2 of the unlocking signal for the lock 57 so as to erase the U- index without changing the sequence of the information corresponding to the containers by a "buffering" and reentering operation. The erasing switch 76 and, if G4 confirms acceptance of the container by the conveying system, the control switch 70, too, is, therefore, set by the signal ere2. As a result, the U-index is also erased during the search operation.

Failure of the detecting element G4 to confirm acceptance of the container by the conveying system indicates that the transfer mechanism has not functioned properly, in which case an error signal is sent to a monitoring circuit. In that case, the control switch 70 is not set either so that the entire information corresponding to the container is erased in the course of the search operation. This has the added advantage that removal of the container from the transfer position 55 in the event of necessary repairs will not affect the contents of the shift register 6.

The input of the two new indices $w$ and $U$ is controlled by the stand-by switch 96 and the transfer switch 97.

To simplify the whole control system, the side track 53 is connected to the switch 52 to avoid that an arriving container can only be discharged when the discharge facilities are free. The side track may be so designed that it can accommodate any desired number of containers without impeding the discharge operation.

In principle, the location of the switch 52 is not dependent on the location selected for the transfer position 55 in the design of the station. However, in order to enable the detecting element G1, which emits a signal upon arrival of a container, to be employed for monitoring both discharge and feeding operations, it is advisable to locate these two points at a suitable distance from the detecting element G1.

Application of the control system described is not limited to installations with a single closed-circuit conveying system, but is also suitable for installations with a plurality of branches and junctions, one of which is shown in FIG. 7 by way of example. This installation includes two switches and two junctions. The main conveying system forms a ring with the stations /11, /12 . . . /17. In these station identifying tags, the first digit designates the number of the line and the second digit the number of the station within that line. These two digits are designated $p$ and $m$. In the installation shown by schematic representation in FIG. 7, a line with the number /2 originates at the station /13 which is provided with a switch. The station /22 i.e., the second station of the second line, is also provided with a switch which leads to a third line.

For station scanning purposes, switches and junctions are treated like normal feed and discharge stations. In the example shown in FIG. 7, station scanning starts at station /11 and ends at station /32. As previously described in connection with other examples, each track section number is identical with the number of the preceding station. Accordingly, track station /12 is that track section which follows after station /12 in the direction of conveyance.

The operation of a switch 52 is not dependent on the line section in which the destination of the container is located. Consequently, in accordance with the diagram shown in FIG. 8, further comparators 109 are used to determine whether a destination tag requiring an operation of the switch corresponds to a container arriving at the detecting element G1. For the sake of simplicity it has been assumed that the shift register 6 again has six lines. However, the capacities of the columns 8 of the shift register 6 which accommodate the destination and postion identifying tags respectively is such that each can accommodate the two digits forming an identifying tag. The line number pz6 in the sixth line of the shift register 6 is compared with the line number $p2$ when the switch is scanned. The operation of switching the line numbers $p2$, $p3$ etc. through to the various levels of the comparator 109 may be programmed to suit the design of the installation. For example, if a container with the destination tag 32 is fed in at a station 11 of an installation in accordance with FIG. 7, the switch of station 13 as well as that of station 22 must be operated. The switch 13 is operated whenever a destination tag includes the line numbers 2 or 3, because these lines can only be reached by a container when switch 13 is in a corresponding position. The switch at station 22, on the other hand, must be operated whenever the destination tag of a container includes the line number 3. The identifying tags are checked by the corresponding levels of the comparator 109 and this check is only performed when a station is scanned which is provided with a switch. The signals $p2$, $p3$ etc. are applied to the various levels of the comparator 109 via gates 102 which are open when a station is scanned which is provided with a switch.

Each switch station is provided with a detecting element G5 which is located directly aft of the switch 52 and checks whether the container has actually been transferred to the line with the other identifying digit $p$. In the logic circuit, the gate 20', which precedes the setting input of the erasing switch 17, is replaced by a gate (not shown) which is open when the comparator 9 signals coincidence between the position identifying tag and the index, when, in addition, the destination store switch is in the set position and the signal which indicates that the distance from a preceding container is sufficient is being applied and when, additionally, the destination tag in the comparator 9 or one of the line numbers in the comparator 109 coincide. The erasing switch 17 serves to input the $a$-index. In a manner similar to that described in connection with the discharge operation, the information composed of the identifying tags is, upon arrival, first provided with the new track section number p1m2 and, additionally, with a discharge index, if the previously described gate conditions are fulfilled. The switch is operated if, at the end of the time interval ta, it is found that a sufficient distance is also being maintained with respect to a following container.

At the end of the switch operating signal wse, the detecting element G5 checks whether the container has actually been transferred to the track section p2m1. In that case, an additional control switch (not shown) is set together with the input switch 15 and the destination store switch 16 and a new search operation is initiated. The signal emitted by the detecting element G5 also prevents the erasing switch 76 from being set, thus ensuring the necessary "buffering" and reentry of the destination tag.

In addition, a rearranging device is provided with generates the new position identifying tag. The method operation of this rearranging device is such that if the position identifying tag /13, for example, is applied to its input it will generate the identifying tag /20 at its output (cf. FIG. 7). The rearranging device is practically a code converter which, when a specific signal is applied to its input, generates a specific signal corresponding to that input signal at its output.

In principle, the operation of joining two lines is the same as that of feeding a container into the system. Here again, the feeding line may be provided with a stand-by track. Invariably, the feeding line is equipped with a lock to avoid collisions of containers. The stand-by track is separated from the mechanical drive of the track section ahead. The through-going track section has the track section tag $j$, while the feeding line is identified by the track section tag $i$.

The following storage and control operations are involved: At the beginning of the unlocking signal for the lock at the junction between the track section $j$ and the track section $i$ a search operation is initiated. However, in this case the information to be searched is related to the track section $j$ and not to the track section $i$. This is ensured by a rearranging device in a manner similar to that explained previously. As soon as the corresponding container information has been found, it is "buffered" and, together with the new track section number $j + 1$ and a transfer index, reentered with the last shift timing pulse. Transfer of the container to the track section $j + 1$ is checked by means of the detecting element G7 provided at the lock. (At a feed station, this detecting element G7 corresponds to the detecting element G4). If the container was transferred, another search operation is initiated to erase the transfer index. The transfer index is erased without "buffering" and reentry at the start of the search operation by setting the control switch 70 and the erasing switch 76, whereby the transfer index is erased during the subsequent station scanning interval.

If the line with the track section $j$ has no stand-by track at its junction, only a lock is provided a short distance ahead of the junction, said lock being controlled by a detecting element G1 to avoid container collisions. A short distance upstream of the junction, both lines incorporate one detecting element each. These detecting elements indicate the line from which a container is arriving.

An essential advantage of the control system described consists in that it enables small systems to be combined into large installations and that it also permits installations with different types of conveying systems to be interlinked. Such interlinkage of two installations is shown schematically in FIG. 9. Each of the two installations has it own electronic control system with shift register. Nevertheless, containers may be exchanged between the two installations if a transfer store is provided at each junction. The additional costs for these transfer stores are very low because these stores may have the same design as the known temporary store or "buffer." A switch whose tongue end points in the direction of the arriving object is provided at the point where the containers to be transferred are to leave the one installation. This switch 54 is followed by a stand-by track 104 which feeds into the line of the other installation. The junction is designed as described above. No track section number is allocated to the stand-by track 104. In the example shown in FIG. 9, the two installations are interlinked in one direction only. However, it shall be understood that a corresponding interlinkage in the opposite direction is also possible, as indicated by the standby track 104' represented by the broken line. The scanning cycles of the two installations are separate and independent of each other. All destination tags include an additional number corresponding to the installation to which the corresponding container is to be transferred. When a container passes the operated switch 54 in the manner previously described in connection with line branches, it moves into the stand-by track 104 and the information corresponding to that container is erased in the shift register of the first installation when the detecting element G3 confirms that the container has actually arrived in the stand-by track 104. At the same time, the destination tag of the container is transferred to a transfer store where it is retained until it is transferred to the shift register of the second installation $j$ when the junction station of the other installation is scanned.

Although the transfer store cannot store more than a single destination tag, the stand-by track can accommodate a plurality of containers because the stored destination tag is transferred to the shift register of the second installation $j$ with a $w$-index by the next station scanning operation by which the junction station $j + 1$ is scanned. In any case, the time until such transfer occurs is only a fraction of the time which elapses until the next container can arrive in the stand-by track 104. Thus, in principle, the operations involved in transferring a container from one installation to another are the same as those involved in container feed and discharge operations with stand-by and side tracks.

Interlinkage of a horizontal conveyor with a tower-type winder does not require any functional extension of the electronic control system. The operations are similar to those previously described in connection with the interlinkage of two conveying installations.

It may happen that a container is moved on past a discharge position because ts distance from a preceding or following container is too short, as previously described. To avoid this, retarders are provided which may be operated by a detecting element incorporated in the line. The distance between two successive containers can then easily be checked by checking the duration of the signal emitted by the detecting element. If that signal is too short, the second of two successive containers may be braked so as to slightly increase its distance from the preceding container.

In addition to the column for the previously mentioned indices, the shift register and the associated stores may be provided with a further column for special items of information which are also cycled together with the position and destination identifying tags. These special items of information may be used to control a by-pass in case of disturbances or preferential routings at peak-load times.

The system described has the advantage of affording a very simple method of supplying the various stations with empty containers. To this end, a number of empty containers are kept circulating in the system at all times. These empty containers are given the destination tag zero so that the information relates to these containers in the shift register 6 only consists of the position identification. If any empty container is called forward by any one station, a key is pressed so set a bistable logic element whereby all $a$-signals of the station concerned are caused to initiate a check to determine whether the corresponding containers bears the destination tag zero. As soon as such a container arrives, the corresponding information in the shift register is provided with an *a*-index and a discharge operation is then initiated.

The number of empty containers circulating through the system at any one time can be readily checked. Admittance of further empty containers to the system may be blocked when a predetermined number of circulating empty containers is reached. In the case of interlinked installations it is also possible to provide for an automatic compensation between the empty containers circulating in each individual installation. For example, in a large installation comprising a plurality of horizontal systems connected by one or two tower-type winders, the number of circulating empty containers in each of the component systems may be kept between predetermined minimum and maximum limits. Automatic compensation of the number of empty containers in the various conveying systems is controlled by a central unit which is common to all component systems. Thus, the shift registers associated with the various component systems are monitored for the number of empty containers. When the number of empty containers in one system exceeds the maximum limit, the next empty container arriving at a turnout or transfer position is provided with a corresponding index in the manner previously described and thus transferred to the other system, e.g., to the tower-type winder.

Alternatively, admittance of further empty containers to a specific component system may be blocked when the number of empty containers circulating in that specific system reaches a predetermined maximum limit. A system so blocked will, however, still admit containers with a valid destination tag.

A collecting line connects the various stations to the electronic control system 110, as shown in FIG. 10. The control cable 111, which connects the various stations to each other and to the electronic control system 110, comprises only seven wires 112, which are identified as *a*-, *b*-, ... *g*-wires. Each station is connected to each of these wires in the same manner.

The stations are scanned successively (time-division mutiplex system).

The *a*-wire 112 leads from the electronic control system 110 to one receiving amplifier 113 of each station. The *b*-, *c*- ... *g*-wires will conduct signals only as long as a station is connected. Only the signals of that station are on line. The electronic control system 110 successively transmits the identifying tags of each station to the *a*-wire 112. At each station, a comparator 114 is connected to the output of the receiving amplifier 113. The other input of the comparator 114 is connected to a fixed-number transmitter by means of which the station number is constantly applied to the comparator 114. As long as the comparator 114 receives the identifying tag allocated to its station from the electronic control system 110 through the *a*-wire 112, it will deliver a "yes"-signal to an output line 115. The "yes"-signal on the output line 115 opens a gate circuit 116 which delivers the transmitter signals $g1, g2 \ldots$ to the *b*-wire 112. Similarly, the "yes"-signal on the output line 115 opens further gate circuits 117, 118 and 119 whose output connections are connected to the *c*-, *d*- and *e*-wires 112. Through the gate circuit 117, control signals generated by the station are lead to the electronic control system 110 via the *c*-wire 112. These are the signals ere1, era2, ere2, wse etc. On the *d*-wire, control signals of the electronic control system 110 are input into a temporary store or "buffer" 120 through the gate 118 which was opened by the "yes"-signal on the output line 115. Similarly, special items of information are delivered to a temporary store or "buffer" 121 via the *e*-wire 112 and the open gate circuit 119. These special items of information may, for instance, be used to release an additional signal by which the respective addressee is notified in the case of stations which discharge containers intended for several different addressees.

Finally, each station is additionally provided with a dial 122 for the input of the destination tag. By means of the dial 122, the destination tag is applied to the *f*-wire 112 through a gate circuit 123 if the gate 123 is open. The gate 123 is open when the "yes"-signal of the comparator 114 is on the output line 115, and when, in addition, a feed key for the container feeding operation has been pressed and a feed key for the admittance of empty containers has not been pressed.

In addition, a key 125 is provided which, when actuated, generates the destination tag zero. The zero destination tag is delivered to the *g*-wire 112 and, thus, the electronic control system 110 through a gate circuit 124 when the comparator 114 delivers the "yes"-signal and when the feed key for the admittance of empty containers has been pressed and the feed key for the container feeding operation has not been pressed.

It shall be understood that the wires *a* through *g* need not be single conductors and that each wire may comprise a number of signal channels. The *a*-wire may, for example, comprise eight individual conductors through which an eight-digit binary number may be transmitted simultaneously, e.g., if the station numbers employed in the system are eight-digit binary numbers.

It shall further be understood that the present invention is not limited to the embodiment shown by way of example, but that deviations and modifications are feasible within the scope of this invention and that, more particularly, individual features of this invention may be applied either separately or in combinations comprising a plurality of such features. The control system in accordance with this invention is also suitable for public transport systems. In particular, this control system may, for example, be employed to control an individual-cab rapid transit system in which the cabs are automatically dispatched to a predetermined destination. Generally, the principle of the present invention may be used to control any system in which individual objects are dispatched to automatically entered destinations along a predetermined route.

A block diagram of such an electronic control system is shown in FIG. 11. From the conveying system, which is represented by the block 201 and includes all stations of the said system, lines 202 lead a distributor 203. This distributor cyclically connects the individual stations with the electronic control system. Through the lines 202 the distributor also delivers a route switch operating signal to the stations of the conveying system whenever an object is to be discharged or shifted from one track to another by means of a route switch.

A control line 204 connects the distributor 203 to a control locig 205 for the store input. The control logic 205, which consists of common commercially available components, determines the position of free locations in the store 206 in a manner known per se. Items of information fed to the control logic 205 are then entered into the store at the locations so determined. The control logic 205 is, therefore, connected to the store 206 by a multiplicity of input lines 207. A backing store or "extended memory" 208 is connected to the store 206 or directly to the control logic 205. This backing store stores the frequency with which a specific position number occurs or the total number of objects momentarily contained in a track section. This backing store 208 serves to determine the serial number of an object newly fed into a track section. It may also be used as a simple means of determining the occupancy of the system or the loading of each track section.

Furthermore, a line 209 leads from the distributor 203 to a read logic 210. The design of this read logic is also known per se. The read logic is connected to the store 206 by a multiplicity of reading lines 211. When a scanned station of the system 201 signals the arrival of an object, the read logic 210 is selected by the distributor 203 via the line 209, whereupon the read logic reads out all items of information in the store 206 which have a position identifying tag corresponding to the track section preceding that station. Through a line 212, these items of information are delivered to a control circuit 213 which finds the serial number of the first container, which is normally the serial number 1. The information contained in this serial number of the first container of this track section is then subjected to a destination and position comparing operation in the manner previously described. If the control circuit 213 determines coincidence between the destination tag of the container entering the station and the destination tag of that station, a pulse emitter 215 is selected via a control line 214. This pulse emitter will then emit a pulse which is transmitted to the route switch of the station via a pulse line 216, the distributor 203 and the line 202. This pulse causes the switch to be thrown so that the object which has now reached its destination is discharged at that station. At the same time, the pulse emitter 215 emits an erase signal whereby the information related to the container which has just been discharged is erased and whereby, in addition, a control circuit 218 which reduces all serial numbers of the information contained in the control circuit 213 by one is selected via a line 217. In this manner, new serial numbers are allocated to all objects in the track section from which an object was removed so as to reflect the changed order in which these objects now rank in that track section, the container which was second before the said discharge now ranking first etc. This change is also signalled to the backing store 208, either directly or via the store 206. The control circuit 213 returns the changed information with the new serial numbers to the control logic 205 which, in turn, writes it back into the store 206.

If the control circuit 213 fails to determine coincidence upon comparing the destination tag with the actual position, a pulse emitter 220 is selected via a control line 219. Via a line 221 corresponding to the line 217 the pulse emitter 220 also selects the control circuit 218 whereby all serial numbers are again reduced by one in the manner previously described. In addition, the pulse emitter 220 delivers a pulse to an identifying tag emitter 223 through an instruction line 222. The identifying tag emitter 223 accepts the destination tag of the container which is just entering the station from the control circuit 213. To this destination tag it adds a new position tag which corresponds to the next track section which the container or object will enter. To this information, the identifying tag emitter 223 also adds a new serial number. The new serial number is determined with the aid of the backing store 208 which stores the total number of objects already contained in the following track section. After the next serial number has been added to this information, the information so completed is fed to the control logic 205 via a feeder 224. The control logic 205 writes this new information into the store 206 at any desired location. As far as the information contained in the store was previously erased by the operation of the read logic 210, all other items of information are also reentered into the store 206 from the control circuit 213 via the control logic 205.

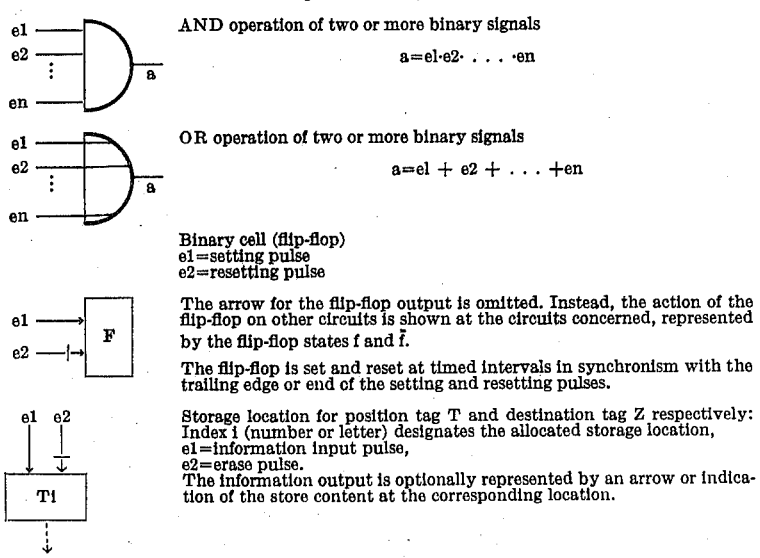

TABLE 1

Explanation of Symbols

AND operation of two or more binary signals $a = e1 \cdot e2 \cdot \ldots \cdot en$ OR operation of two or more binary signals $a = e1 + e2 + \ldots + en$ Binary cell (flip-flop)
e1 = setting pulse
e2 = resetting pulse The arrow for the flip-flop output is omitted. Instead, the action of the flip-flop on other circuits is shown at the circuits concerned, represented by the flip-flop states f and f̄.

The flip-flop is set and reset at timed intervals in synchronism with the trailing edge or end of the setting and resetting pulses.

Storage location for position tag T and destination tag Z respectively: Index i (number or letter) designates the allocated storage location,
e1 = information input pulse,
e2 = erase pulse.
The information output is optionally represented by an arrow or indication of the store content at the corresponding location.

TABLE 1 — Continued

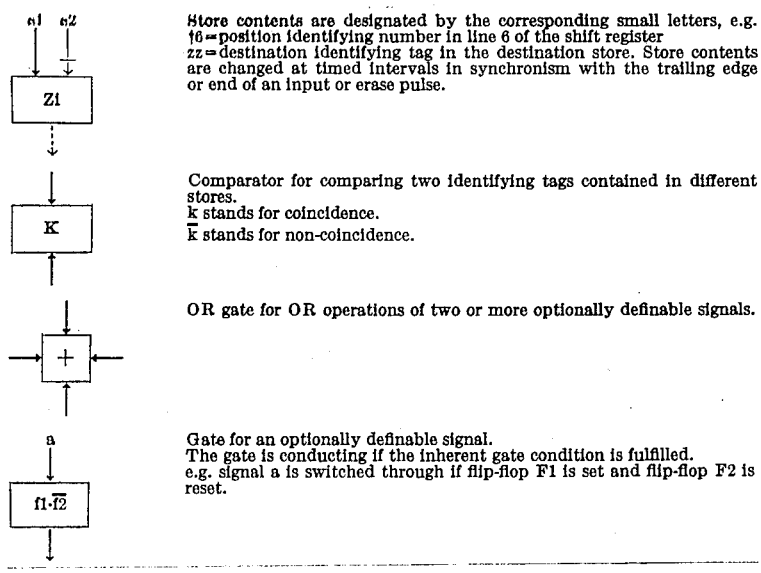

Store contents are designated by the corresponding small letters, e.g.
t6 = position identifying number in line 6 of the shift register
zz = destination identifying tag in the destination store. Store contents are changed at timed intervals in synchronism with the trailing edge or end of an input or erase pulse.

Comparator for comparing two identifying tags contained in different stores.
k stands for coincidence.
k̄ stands for non-coincidence.

OR gate for OR operations of two or more optionally definable signals.

Gate for an optionally definable signal.
The gate is conducting if the inherent gate condition is fulfilled.
e.g. signal a is switched through if flip-flop F1 is set and flip-flop F2 is reset.

Table 2

Abbreviations

- $s1 \ldots s7$—Shift timing pulses
- $st$—Position tag (station number = number of the following track section)
- $tr, zr$—Position and destination tags of the feedback store
- $t6, z6$— Position and destination tags of the sixth line of the shift register
- $m$—Station address
- T1— Station scanning interval
- $n \cdot T1$— Time for a complete scanning cycle
- $n$—Number of stations
- $i$—Number of lines in the shift register
- $e$—feed signal
- $a$—Arrival signal
- $g2$— Signal from detecting element G2 confirming that container had been fed in. Duration: $\geq$ unlocking interval.
- $g3$— Signal from detecting element G3 confirming that container has been discharged. Duration: $\geq$ route switch operating interval
- $era, ere$— Signals at the beginning and end of the unlocking interval. Duration: $\geq$ T1/2 starting with the station scanning cycle.
- $wse$—Signal at the end of the route switch operating interval. Duration: $\geq$ T1/2 starting with the station scanning cycle.
- ha, la—Distance of a container to be discharged from a following container (ha) or a preceding container (la) exceeds a predetermined minimum value required for undisturbed operation of the discharge switch.
- $ta$—A time signal released by the signal which signals the passage of a container to be discharged and required to release the switch operating signal after a time interval ta.
- $tae$— Signal at the end of the time signal Ta. Duration: $\geq$ T1/2 starting with the station scanning cycle.
- V— Storage location for special information.
- ere1— End of the unlocking signal of lock 51.
- era— Beginning of the unlocking signal of lock 57.
- ere2— End of the unlocking signal of lock 57.
- et1— Feed key for container feeding pressed.
- et2— Feed key for admittance of empty containers pressed.

What is claimed is:

1. A system for conveying items along track sections of a conveyor comprising:
    a. a plurality of stations along said conveyor, each station comprising:
        1. means for detecting the arrival of an item at a station,
        2. means for providing station identifying signals upon an item arrival, and
        3. means for discharging an item from said conveyor,
    b. a central electronic control system comprising:
        1. means for connecting each of said plurality of stations to said central control station,
        2. data storage means for storing for each item in said conveyor, track section data, destination data and track section ranking data, said storage means providing output stored data signals,
        3. means for comparing said stored data signals with the station identifying signals of each station,
        4. means for generating discharge signals to said stations upon coincidence of the stored data signals and the station identifying signals,
        5. means for removing from storage said stored data corresponding to a discharged item, and
        6. means for updating said stored track section data and track section ranking data upon the non-coincidence of the stored data signals and the station identifying signals.

2. A system for conveying items along track sections of a conveyor as recited in claim 1 wherein said data storage means comprises a shift register and said track section ranking data is provided by the position of paired track section data and destination data for each item in said shift register, said shift register having an input and an output.

3. A system for conveying items along track sections of a conveyor as recited in claim 2 wherein said connecting means comprises means for cyclically connecting each station to said central control station.

4. A system for conveying items along track sections of a conveyor as recited in claim 3 wherein said cyclic connecting means comprises a ring counter.

5. A system for conveying items along track sections of a conveyor as recited in claim 2 wherein said shift register contains i locations, each location storing a data pair and said central control system further comprises:
   feedback storage means having an input connected to said shift register output and an output connected to said shift register input, and
   a timing generator for providing $i+1$ shifting signals to said shift register upon connection of each of said plurality of stations to said central control system.

6. A system for conveying items along track sections of a conveyor as recited in claim 5 wherein the minimum clock rate $f_t$ for the timing generator is
$$f_t = n(+2)\, v/l,$$
where, $n$ = the number of stations along the conveyor,
$i$ = the number of locations in the shift register,
$v$ = the conveyor speed, and
$l$ = the minimum distance between items.

7. A system for conveying items along track sections in a conveyor comprising:
   a. a plurality of stations along said conveyor, said stations positioned adjacent a preceding and a following tract section,
   b. data storage means for storing for each item in said conveyor,
      1. track section data,
      2. destination data, and
      3. track section ranking data for ranking the order of entry within a track section,
   said data storage means having an input and an output,
   c. item arrival sensing means at each station for providing a signal indicating the arrival of an item within said conveyor system at a station,
   d. station identification generating means providing first and second track section signals identifying station-preceding and station-following track sections respectively,
   e. means for comparing said first track section signals with track section data signals from the output of said data storage means,
   f. means for selecting from said storage means data corresponding to said earliest ranked item within said preceding track section,
   g. means for comparing said second track section signals with item destination data signals from the output of said data storage means,
   h. means for discharging an item from said conveyor in response to said arrival signal if said first and second track section signals coincide with said stored track section and item destination data signals, respectively, of said selected earliest ranked item, and
   i. means for updating said stored track section data, destination data, and track section ranking data,
   whereby said items are conveyed in said conveyor and discharged at predetermined destination stations.

8. A system for conveying items along track sections of a conveyor as recited in claim 7 wherein said conveyor system is a closed-loop recirculating conveyor.

9. A system for conveying items along track sections of a conveyor as recited in claim 7, wherein said data storage means comprises a shift register having an input and an output.

10. A system for conveying items along track sections of a conveyor as recited in claim 9, wherein said shift register comprises a plurality of register locations for storing and shifting in pairs said track section and destination data, whereby said ranking data is provided by the locations position of said paired data within said shift register.

11. A system for conveying items along track sections of a conveyor as recited in claim 7, wherein said updating means comprises:
   a. means for erasing said stored track section data, destination data and track section ranking data from said storate means upon the discharge of an item, and
   b. means for replacing said stored track section data by track section data corresponding to the station following track section upon the non-discharge of an item arriving at a station.

12. A system for conveying items along track sections of a conveyor as recited in claim 10 further comprising:
   a. feedback storage means having an output connected to the input of said shift register,
   b. change-over switching means for connecting the output of said shift register to an input of said feedback storage means upon the non-coincidence of the first track section signals with said stored track section data signals, and for disconnecting the output of said shift register to the input of said feedback storage means upon the coincidence of the first track section signals with the stored track section data signals.

13. A system for conveying items along track sections of a conveyor as recited in claim 7, wherein said comparing and selecting means are positioned at a central control station electrically connected to said plurality of conveyor stations.

14. A system for conveying items along track sections of a conveyor as recited in claim 13, wherein said central control station is cyclically connected to said plurality of conveyor stations.

15. A system for conveying items along track sections of a conveyor as recited in claim 14, wherein said central control station is electrically connected to said plurality of conveyor stations by means of a ring counter having a number of positions equal to the number of stations, said ring counter providing means for generating said first track section signals.

16. A system for conveying items along track sections of a conveyor as recited in claim 15, wherein said central control station is electrically connected to said plurality of conveyor stations by a second ring counter having a number of positions equal to the number of stations in the system and whose switching position provides means for generating said second track section identifying signal.

17. A system for conveying items along track sections of a conveyor as recited in claim 7 further comprising:
   a. item entering storage means for storing destination data for an item entering said conveyor system, b. means for storing data corresponding to a valid group of destinations, c. comparing means connected to said item entering storage means and valid group storage means for comparing the entering destination data with said valid group data, and d. means for preventing the entry of an item into said conveyor if said item entering data does not coincide with a valid destination.

18. A system for conveying items along track sections of a conveyor as recited in claim 17 wherein said entry preventing means comprises a locking gate.

19. A system for conveying items along track sections of a conveyor as recited in claim 7 further comprising:

a. a storage register having an input and an output b. means for entering destination data of an item entering said conveyor system into said storage register, c. feed sensing means at said conveyor for detecting the entry of an item into said conveyor system, and d. input switching means connected to said arrival and feed sensing means for connecting the output of said storage register to said data storage means and said first track section signals to said data storage means.

20. A system for conveying items along track sections of a conveyor as recited in claim 19, wherein said means for entering destination data comprises a dial, keyboard or similar.

21. A system for conveying items along track sections of a conveyor as recited in claim 19, wherein said data storage means is provided with additional storage areas for storing special data upon the activation of said means for entering destination data and the non-activation of said feed sensing means indicating the non-entry of an item into said conveyor system.

22. A system for conveying items along track sections of a conveyor as recited in claim 21, wherein the actuation of said feed sensing means by an item entered into said conveyor system erases the stored special data corresponding to said item.

23. A system for conveying items along track sections in a conveyor system comprising:

a. a plurality of closed-looped conveyor systems as recited in claim 8, b. a transfer station for connecting two of said conveyor systems, c. a transfer buffer for storing data identifying a particular conveyor station, d. means for generating at said transfer station a signal identifying said transfer station, e. conveyor-data comparing means for comparing said transfer signal with said stored conveyor identifying data and providing an output signal indicating a coincidence of said compared data, and f. switching means at said transfer station responsive to said coincidence output signal for transferring an item from one to another of said conveyor systems.

24. A system for conveying items along track sections in a conveyor system as recited in claim 23 further comprising:

a. feed sensing means for sensing the transfer of an item from said one to another of said conveyor systems, and b. means for erasing said track section data, said destination data and said track section ranking data from the data storage means of said one conveyor system and for inputing track section data, destination data and track section ranking data in the data storage means of the other of said conveyor systems.

25. A system for conveying items along the track sections in a conveyor system as recited in claim 7 further comprising, a. means for detecting the distance between items in said conveyor system, and b. means for retarding items in response to said distance detecting means whereby item gap spacing is increased.

26. A method of conveying items along track sections in a conveyor system comprising the steps of:

a. entering an item into said conveyor system at a feeding station, b. inputing data into a data storage means for each entering item, and input data comprising:
   1. track section data,
   2. destination data, and
   3. track section ranking data, c. storing in said storage means said input data, d. conveying items in said conveyor system along conveyor track sections from said feeding station to a discharge station, e. sensing the arrival of each item arriving at a discharge station, f. generating station identifying signals identifying said discharge station upon the arrival of an item at said discharge station, g. comparing said station identifying signals with data signals from said data storage means, h. generating a discharge signal if said stored data signals correspond to said station identifying signals, i. discharging an item at said discharge station in response to said discharge signal, j. erasing said stored data corresponding to said discharged item, k. updating said stored data in the absence of said discharge signal, and conveying said item to another discharge station in the absence of said discharge signal.

27. A method of conveying items along track sections in a conveyor system as recited in claim 26, wherein the station identifying signals are generated by:

a. generating a first station identifying signal which identifies the track section preceding said station along the direction of conveyance, and b. generating a second identifying signal which identifies the track section following said station along the direction of conveyance, and wherein said method further comprises the steps of:

c. comprising said first station identifying signal to said stored track section data, d. selecting from said stored item data the item data corresponding to the earliest ranked item within said preceding track section, e. generating a first coincidence signal upon the coincidence of said first station identifying signal and said stored track section data of said selected earliest ranked data, f. comparing said second station identifying signal to said stored destination data corresponding to said selected earliest ranked item within said preceding track section, g. generating a second coincidence signal upon the coincidence of said second station identifying signal and said stored destination data whereby said discharge signal is generated upon the occurrence of said first and second coincidence signals.

28. A method of conveying items along track sections in a conveyor system as recited in claim 27 further comprising the steps of:
   a. storing said track section data and destination data as paired data in a shift register having a number of register locations equal to the allowable maximum number of items within said conveyor,
   b. inputting entering item data in the first location of said shift register,
   c. shifting said entered data along successive locations of said shift register,
   d. feeding output data from the last location of said shift register into a feedback buffer, and
   e. feeding output data from said feedback buffer into the first location of said shift register whereby said ranking data is determined by the position of said paired data stored in said shift register location.

29. A method of conveying items along track sections in a conveyor system as recited in claim 27, wherein said stored data is updated in the absence of a discharge signal by replacing said track section stored data by data corresponding to said second discharge station identifying signal upon the occurrence of a first coincidence signal.

30. A method of conveying items along track sections in a conveyor system as recited in claim 29 further comprising the steps of:
   a. storing in a buffer storage area valid destination data corresponding to discharge stations within said conveyor system,
   b. comparing, for each item entering the conveyor system, the input destination data with the stored valid destination data, and
   c. preventing the entry of said entering item into said conveyor if the input destination data does not correspond to a valid destination.

* * * * *